United States Patent
Mansell et al.

(10) Patent No.: US 12,481,501 B2
(45) Date of Patent: Nov. 25, 2025

(54) PROCESSING APPARATUS, METHOD AND COMPUTER PROGRAM FOR A VECTOR COMBINING INSTRUCTION

(71) Applicant: Arm Limited, Cambridge (GB)

(72) Inventors: David Hennah Mansell, Norwich (GB); Eric Biscondi, Roquefort les Pins (FR)

(73) Assignee: Arm Limited, Cambridge (GB)

( * ) Notice: Subject to any disclaimer, the term of this patent is extended or adjusted under 35 U.S.C. 154(b) by 19 days.

(21) Appl. No.: 18/577,983

(22) PCT Filed: Jun. 22, 2022

(86) PCT No.: PCT/GB2022/051584
§ 371 (c)(1),
(2) Date: Jan. 9, 2024

(87) PCT Pub. No.: WO2023/002145
PCT Pub. Date: Jan. 26, 2023

(65) Prior Publication Data
US 2024/0319999 A1    Sep. 26, 2024

(30) Foreign Application Priority Data
Jul. 21, 2021 (GB) ..................................... 2110506

(51) Int. Cl.
*G06F 9/30*    (2018.01)
(52) U.S. Cl.
CPC ...... *G06F 9/30036* (2013.01); *G06F 9/30038* (2023.08); *G06F 9/3012* (2013.01); *G06F 9/30145* (2013.01)

(58) Field of Classification Search
CPC ............. G06F 9/30036; G06F 9/30145; G06F 9/30038; G06F 9/3012
See application file for complete search history.

(56) References Cited

U.S. PATENT DOCUMENTS

| | | |
|---|---|---|
| 2005/0193050 A1 | 9/2005 | Sazegari |
| 2011/0153707 A1* | 6/2011 | Ginzburg ............. G06F 9/3001 708/523 |
| 2019/0324747 A1 | 10/2019 | Boswell et al. |

OTHER PUBLICATIONS

Combined International Search and Examination Report for International Application No. GB2110506.9 dated Apr. 25, 2022.
(Continued)

*Primary Examiner* — Zachary K Huson
(74) *Attorney, Agent, or Firm* — NIXON & VANDERHYE P.C.

(57) ABSTRACT

There is provided a processing apparatus, method and computer program. The apparatus comprising: decode circuitry to decode instructions; and processing circuitry to apply vector processing operations specified by the instructions. The decode circuitry is configured to, in response to a vector combining instruction specifying a plurality of source vector registers each comprising source data elements in a plurality of data element positions, one or more further source vector registers, and one or more destination registers, cause the processing circuitry to, for each data element position: extract first source data elements from the data element position of each source vector register; extract second source data elements from the one or more further source vector registers; generate a result data element by combining each element of the first source data elements and the second source data elements; and store the result data element to the data element position of the one or more destination registers.

19 Claims, 16 Drawing Sheets

(56) References Cited

OTHER PUBLICATIONS

Figure 1:
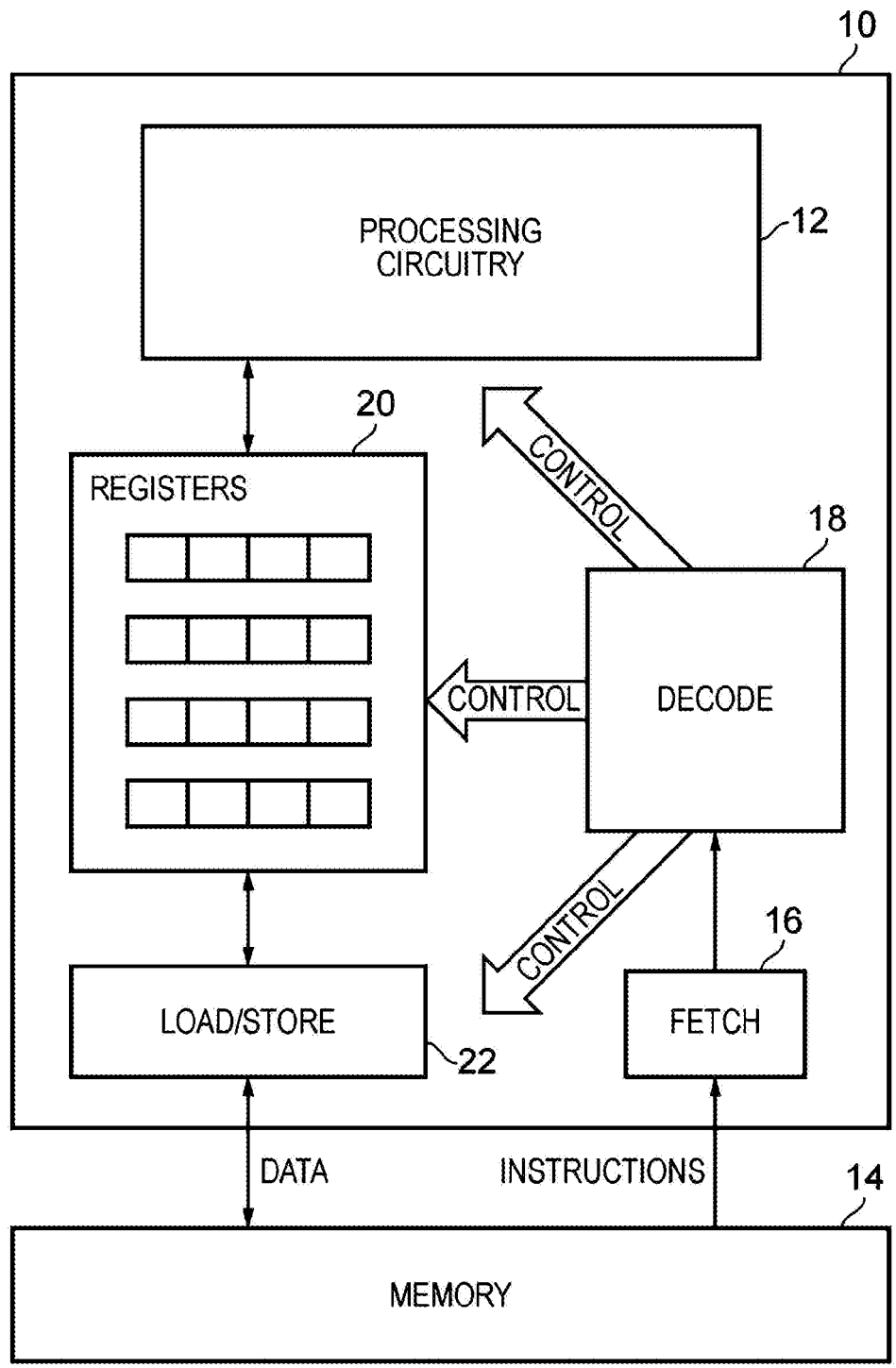

International Search Report and Written Opinion for International Application No. PCT/GB2022/051584, dated Sep. 9, 2022.

* cited by examiner

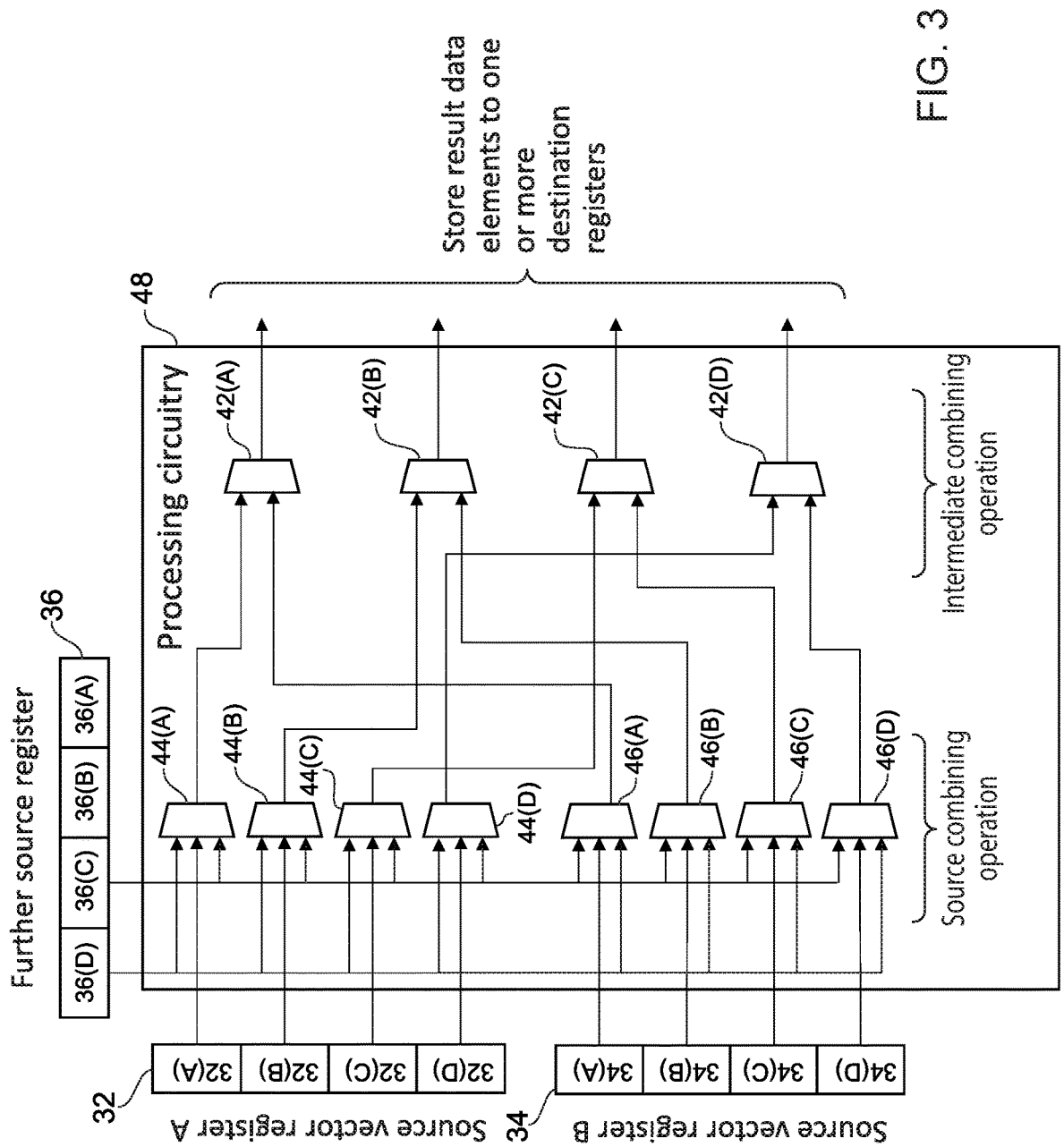

PROCESSING APPARATUS, METHOD AND COMPUTER PROGRAM FOR A VECTOR COMBINING INSTRUCTION

Processing apparatuses may be provided with processing circuitry to perform vector processing operations. Such operations may involve operations on elements of vector registers with processing circuitry designed to enable efficient processing of one or more instructions.

According to some example configurations there is provided processing apparatus comprising: decode circuitry to decode instructions; and processing circuitry to selectively apply vector processing operations specified by the instructions to input data vectors comprising a plurality of input data items at respective positions in the input data vectors, wherein the decode circuitry is configured to, in response to a vector combining instruction specifying a plurality of source vector registers each comprising source data elements in a plurality of data element positions, one or more further source vector registers, and one or more destination registers, generate control signals to cause the processing circuitry to, for each data element position of the plurality of data element positions: extract first source data elements from the data element position of each source vector register; extract second source data elements from the one or more further source vector registers; perform combining operations to generate a result data element, wherein the result data element is calculated by combining each element of the first source data elements and the second source data elements; and store the result data element to the data element position of the one or more destination registers.

According to other example configurations there is provided a method for operating a processing apparatus comprising decode circuitry to decode instructions and processing circuitry to selectively apply vector processing operations specified by the instructions to input data vectors comprising a plurality of input data items at respective positions in the input data vectors, the method comprising: generating, using the decode circuitry, in response to a vector combining instruction specifying a plurality of source vector registers each comprising source data elements in a plurality of data element positions, one or more further source vector registers, and one or more destination registers, control signals to cause the processing circuitry to perform the steps of, for each data element position of the plurality of data element positions: extracting first source data elements from the data element position of each source vector register; extracting second source data elements from the one or more further source vector registers; performing combining operations to generate a result data element, wherein the result data element is calculated by combining each element of the first source data elements and the second source data elements; and storing the result data element to the data element position of the one or more destination registers.

According to other example configurations there is provided a computer program for controlling a host processing apparatus to provide an instruction execution environment, comprising: decode logic to decode instructions; and processing logic to selectively apply vector processing operations specified by the instructions to input data vectors comprising a plurality of input data items at respective positions in the input data vectors, wherein the decode logic is configured to, in response to a vector combining instruction specifying a plurality of source vector registers each comprising source data elements in a plurality of data element positions, one or more further source vector registers, and one or more destination registers, generate control signals to cause the processing logic to, for each data element position of the plurality of data element positions: extract first source data elements from the data element position of each source vector register; extract second source data elements from the one or more further source vector registers; perform combining operations to generate a result data element, wherein the result data element is calculated by combining each element of the first source data elements and the second source data elements; and store the result data element to the data element position of the one or more destination registers.

Figure 2:
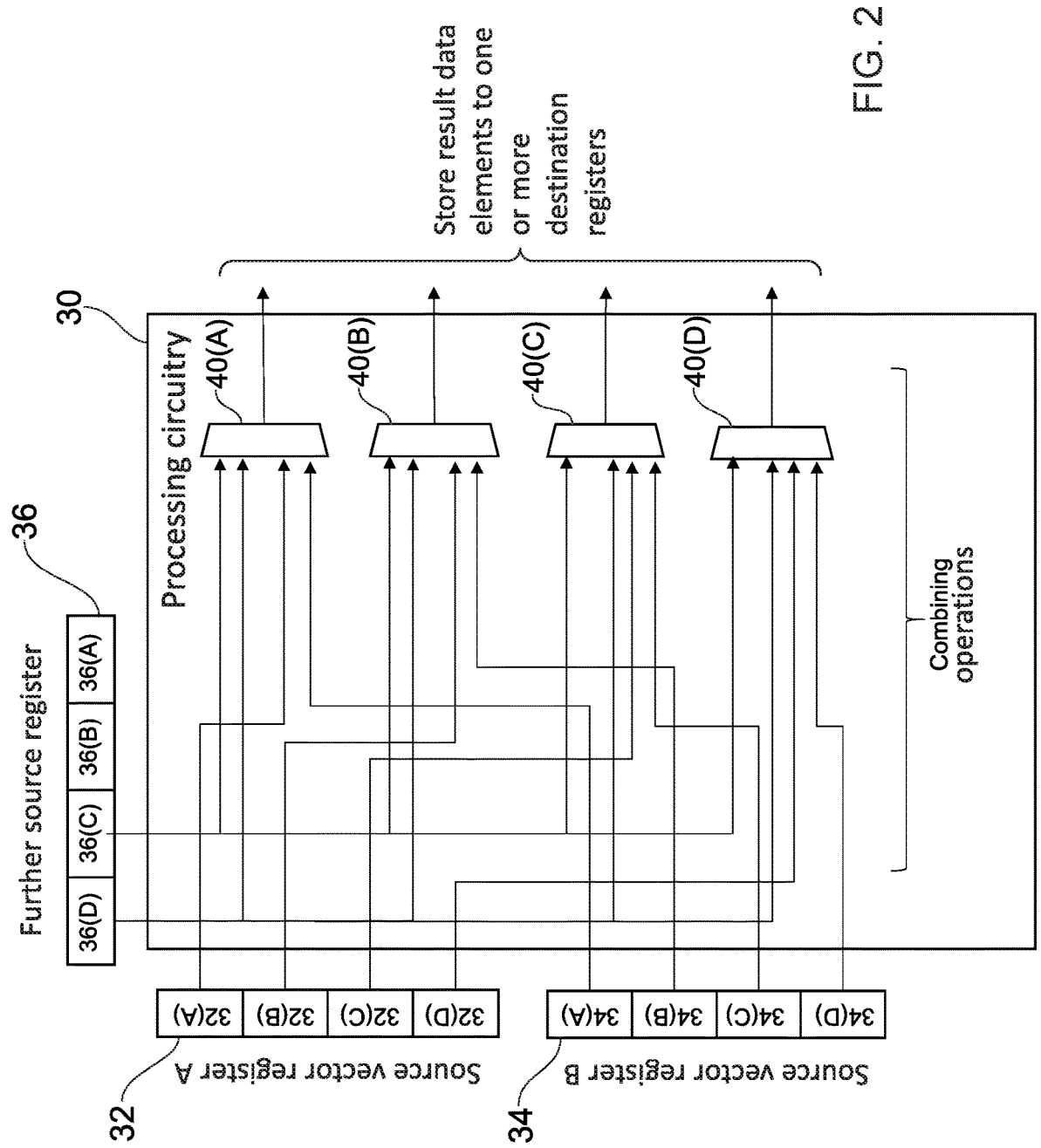
Figure 4A:
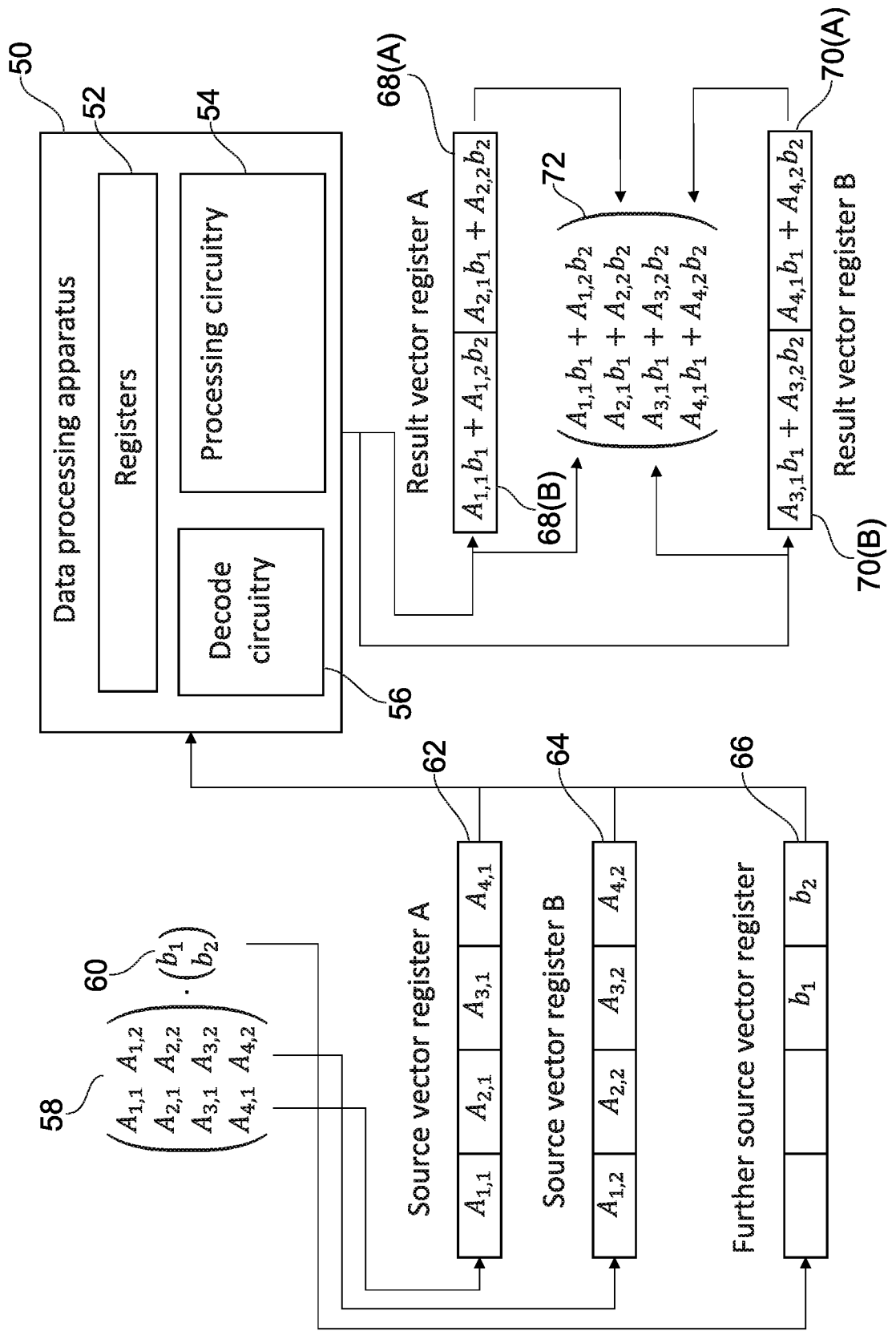
Figure 4B:
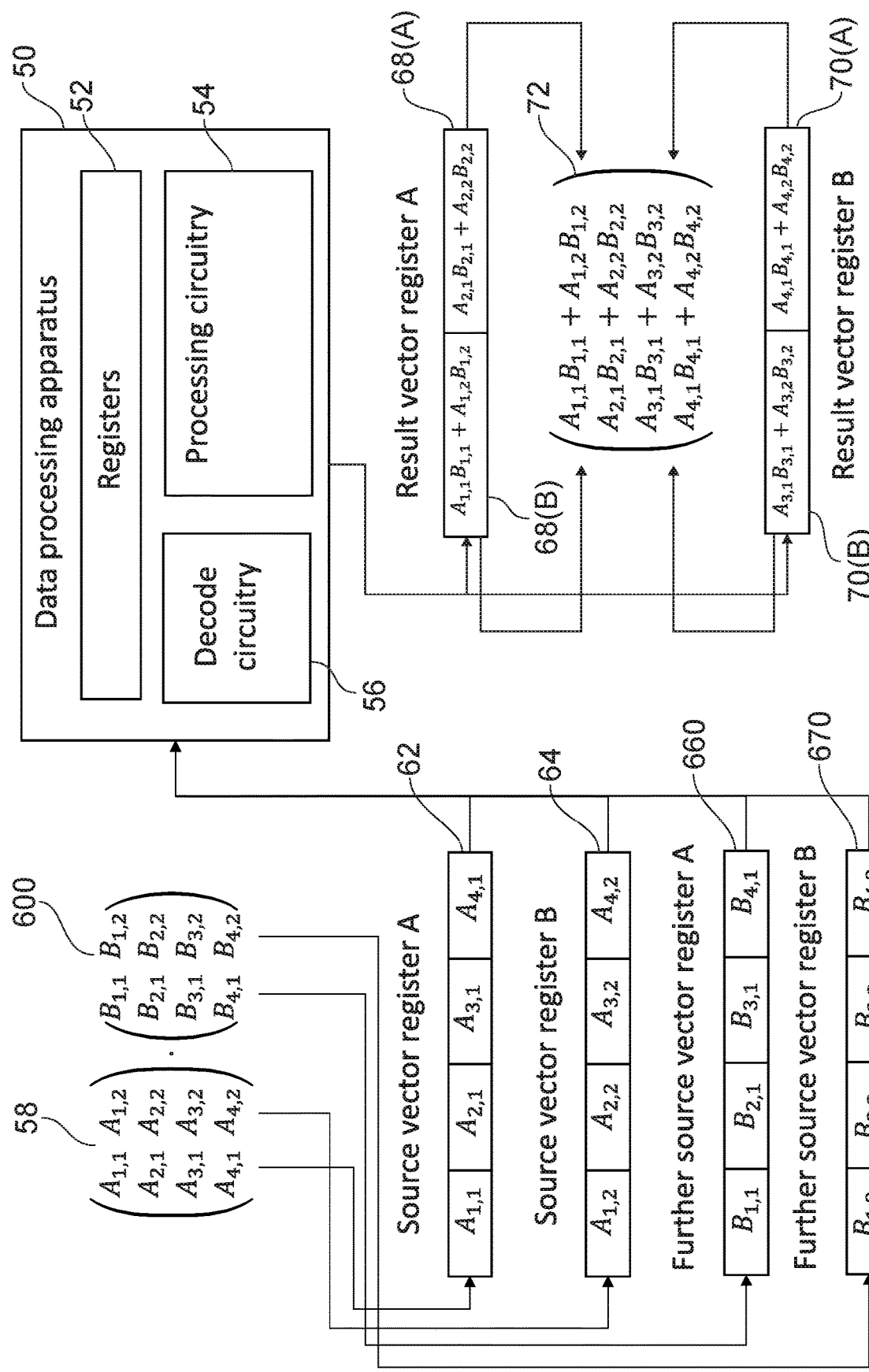
Figure 5:
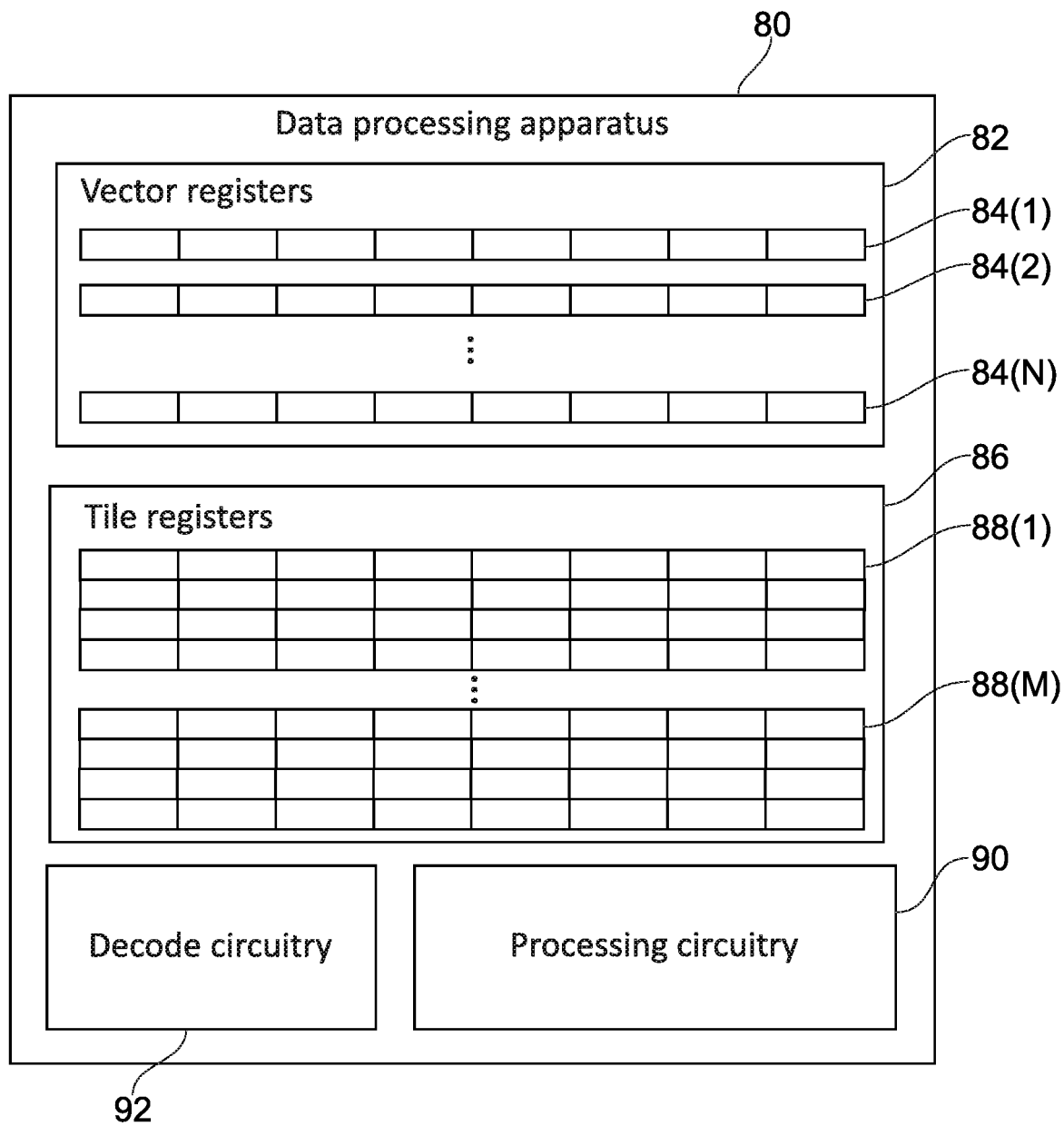
Figure 6:
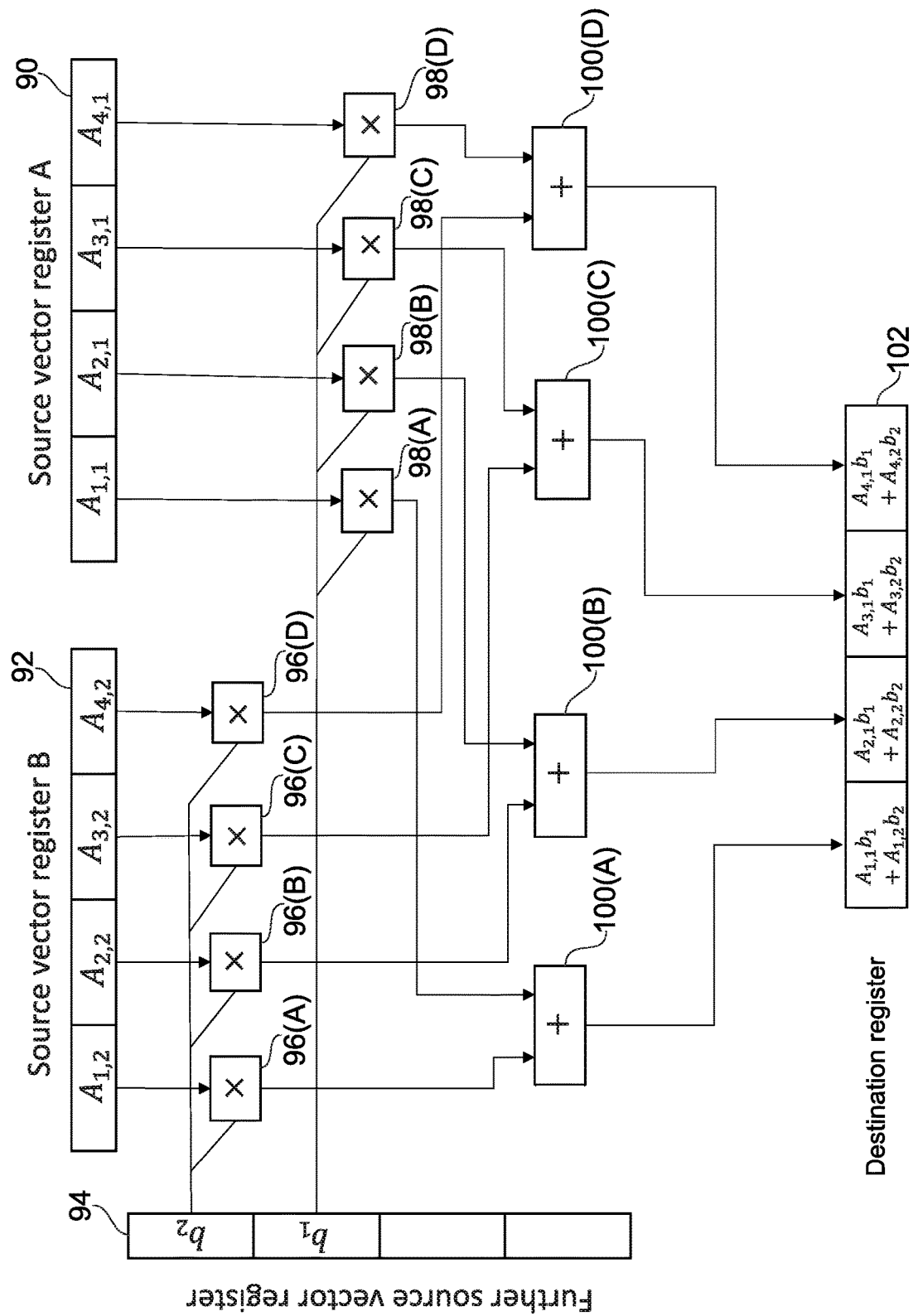
Figure 7:
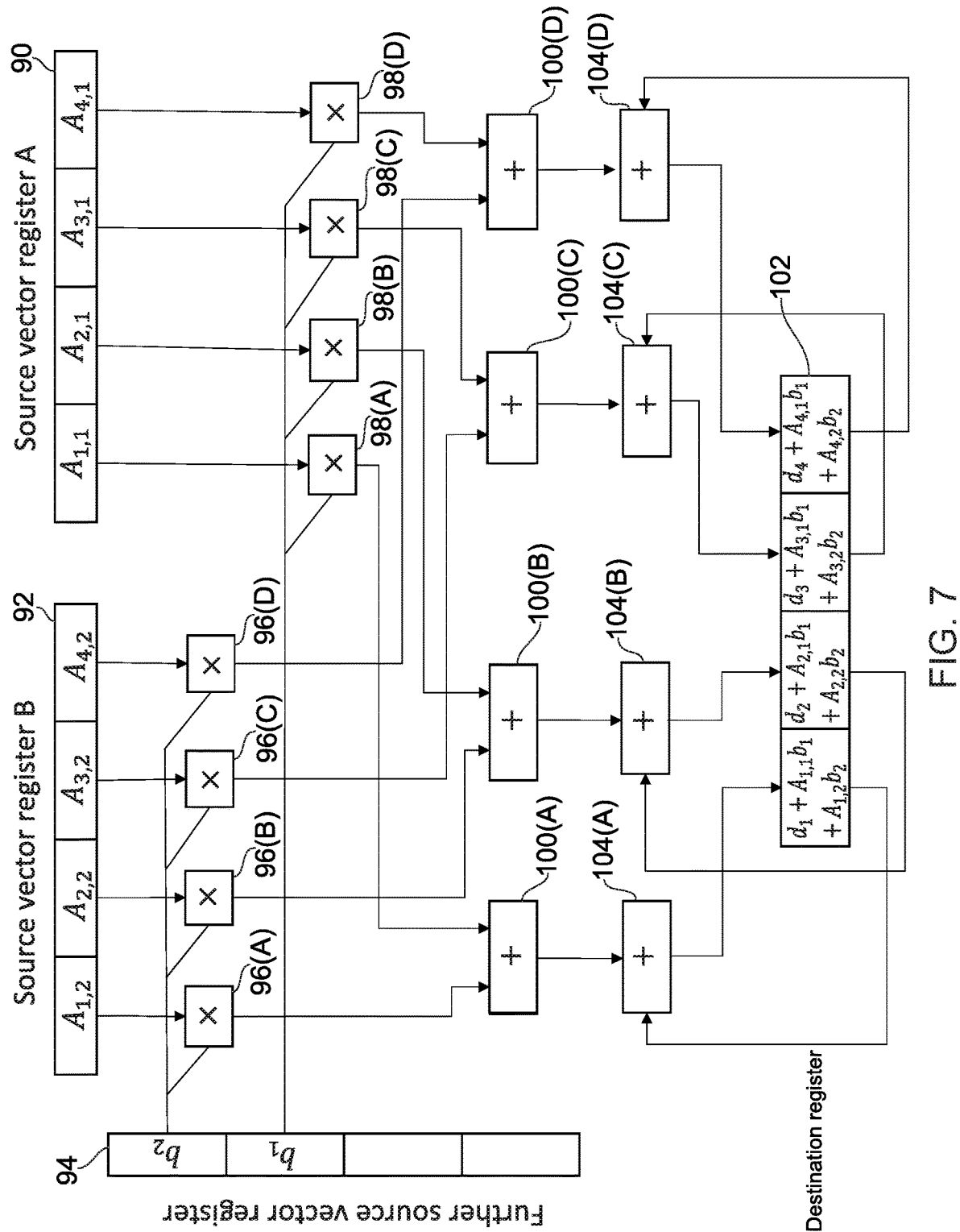
Figure 8:
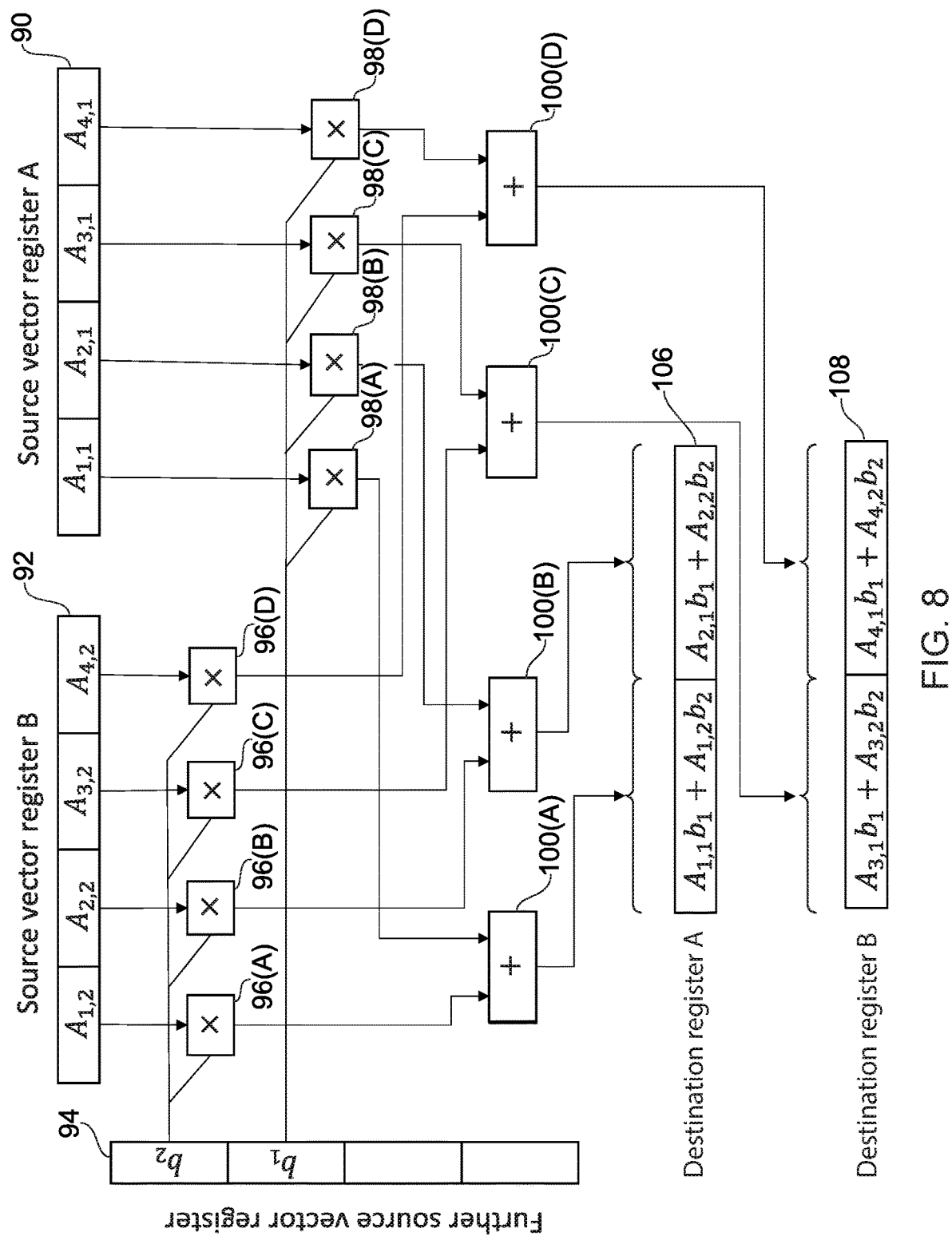
Figure 9:
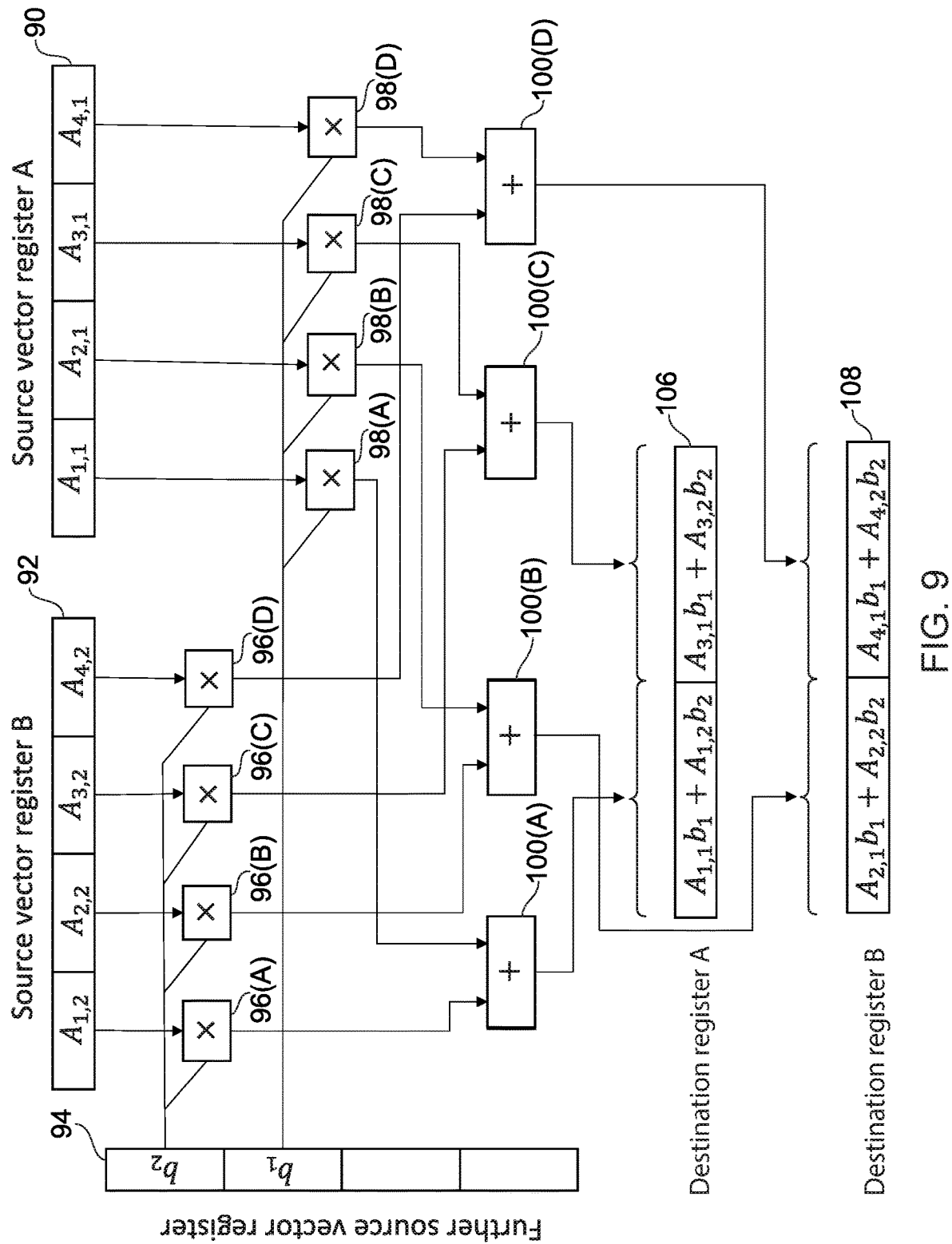
Figure 10:
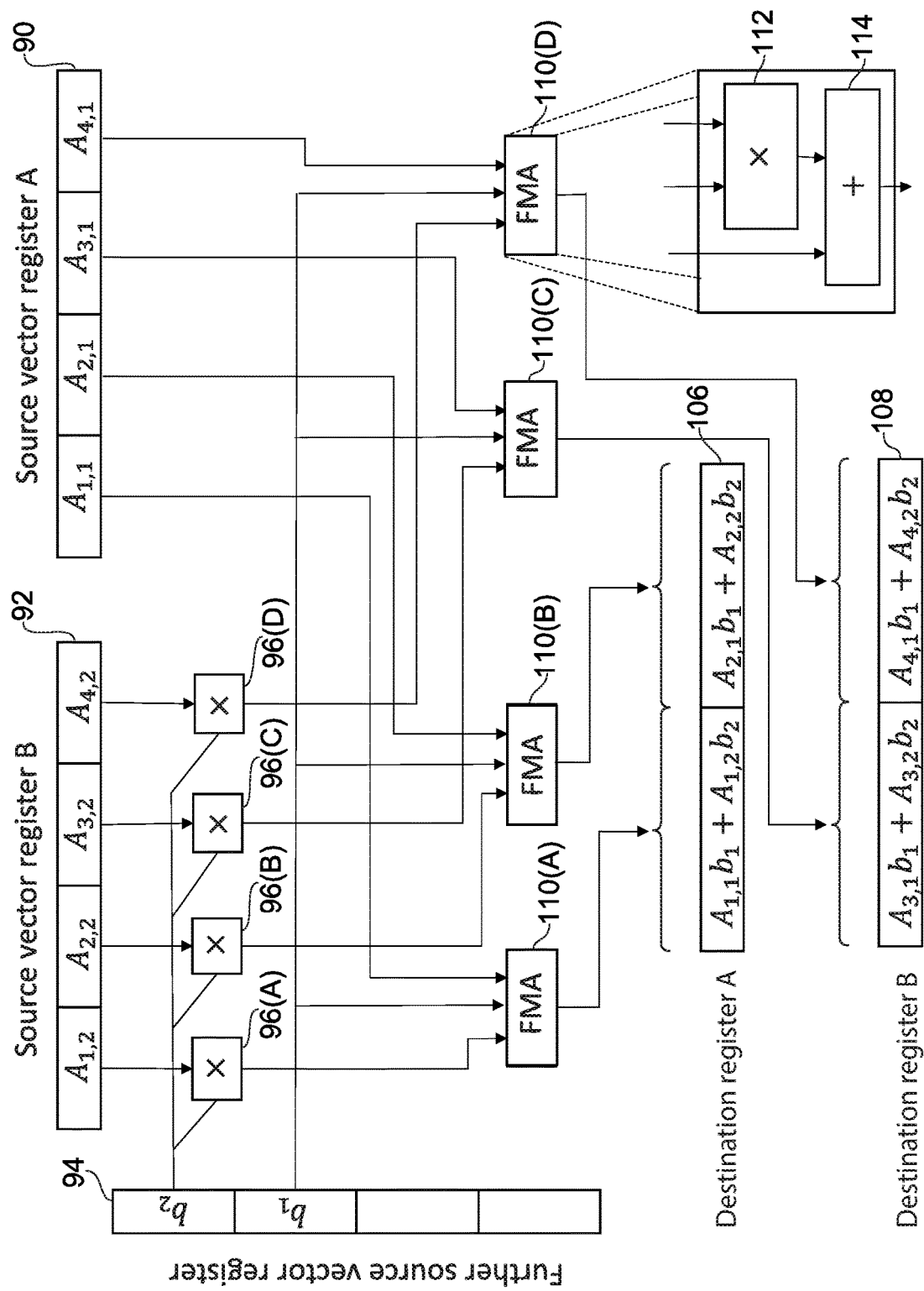
Figure 11A:
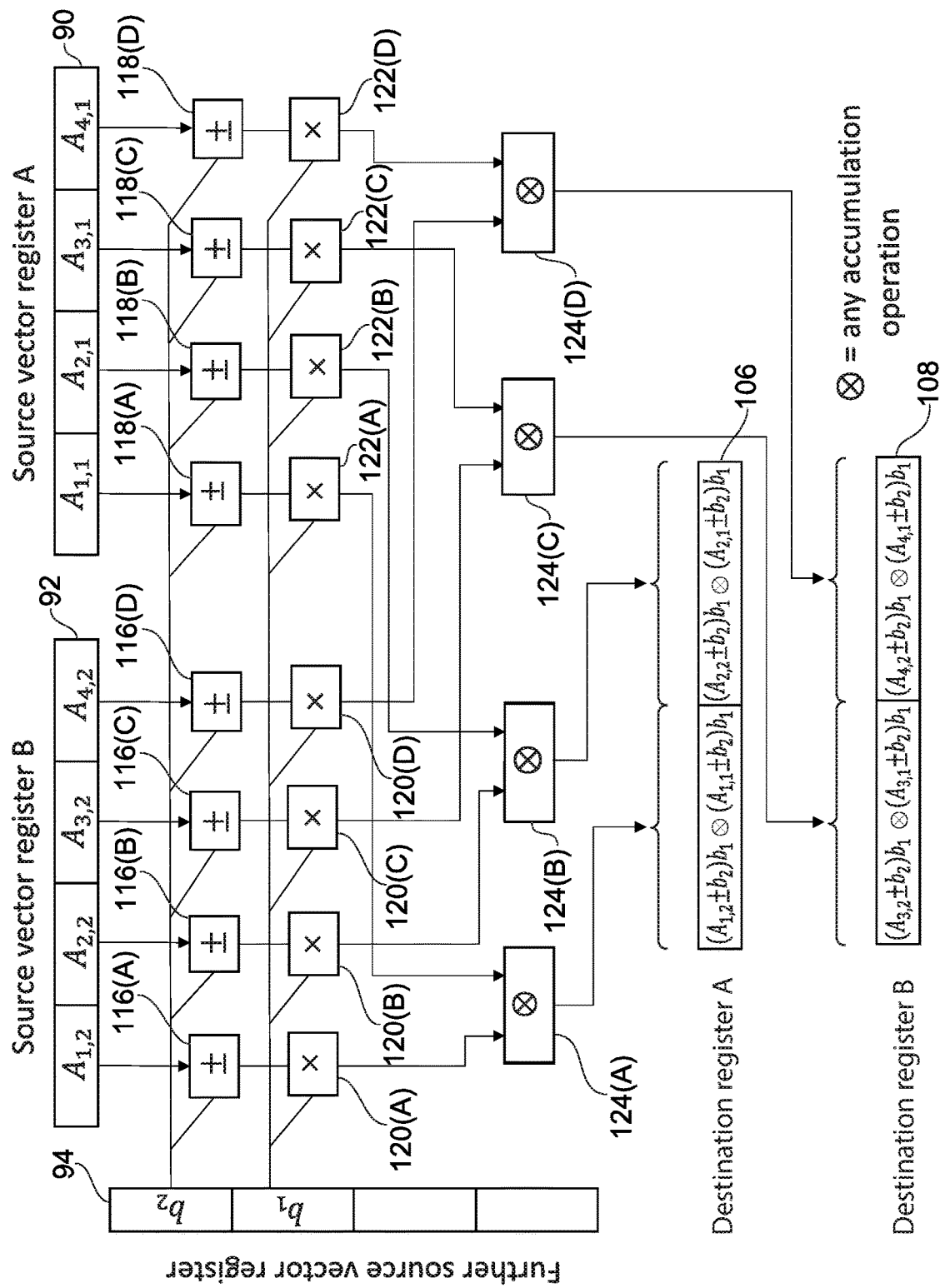
Figure 11B:
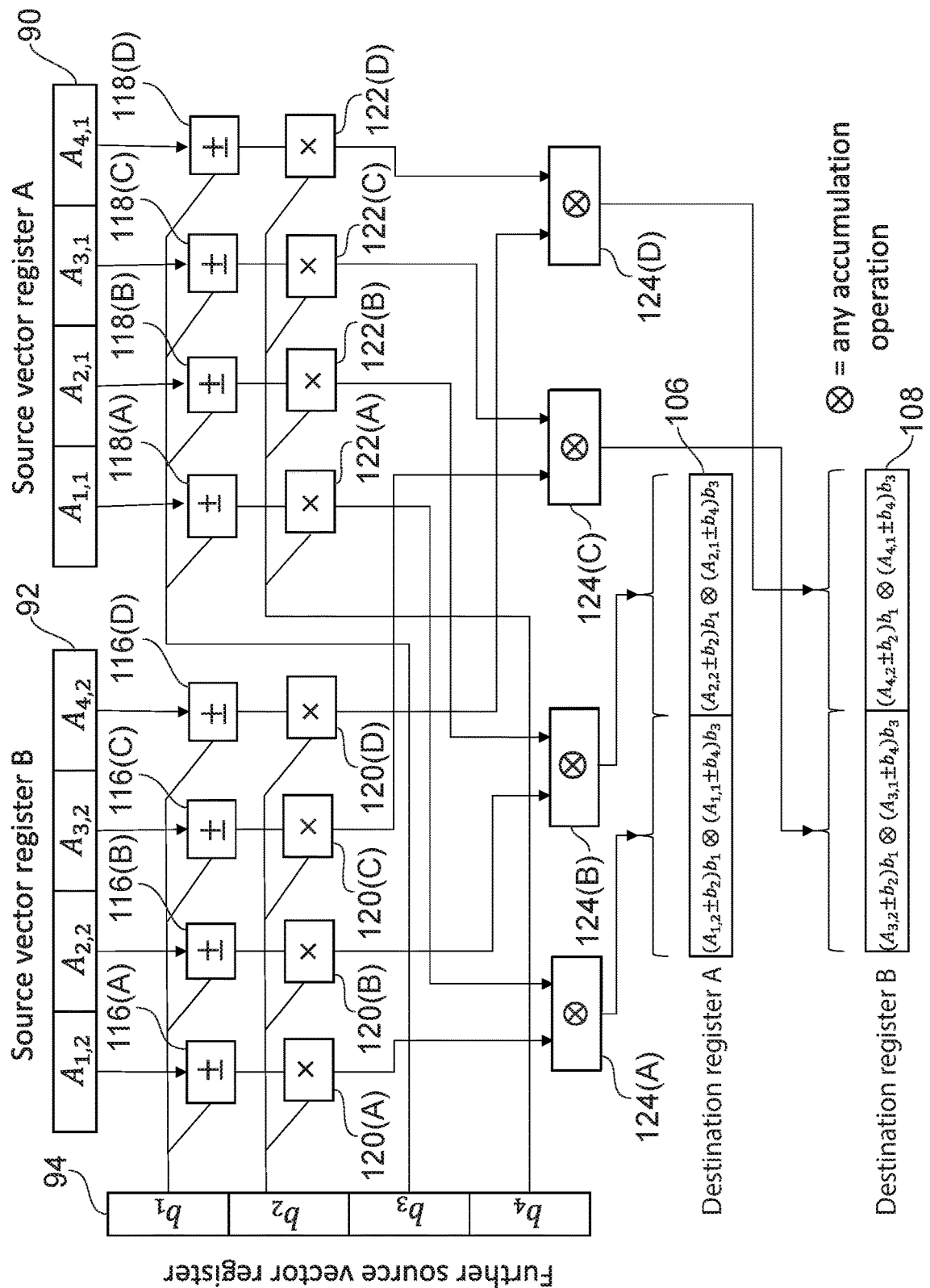
Figure 12:
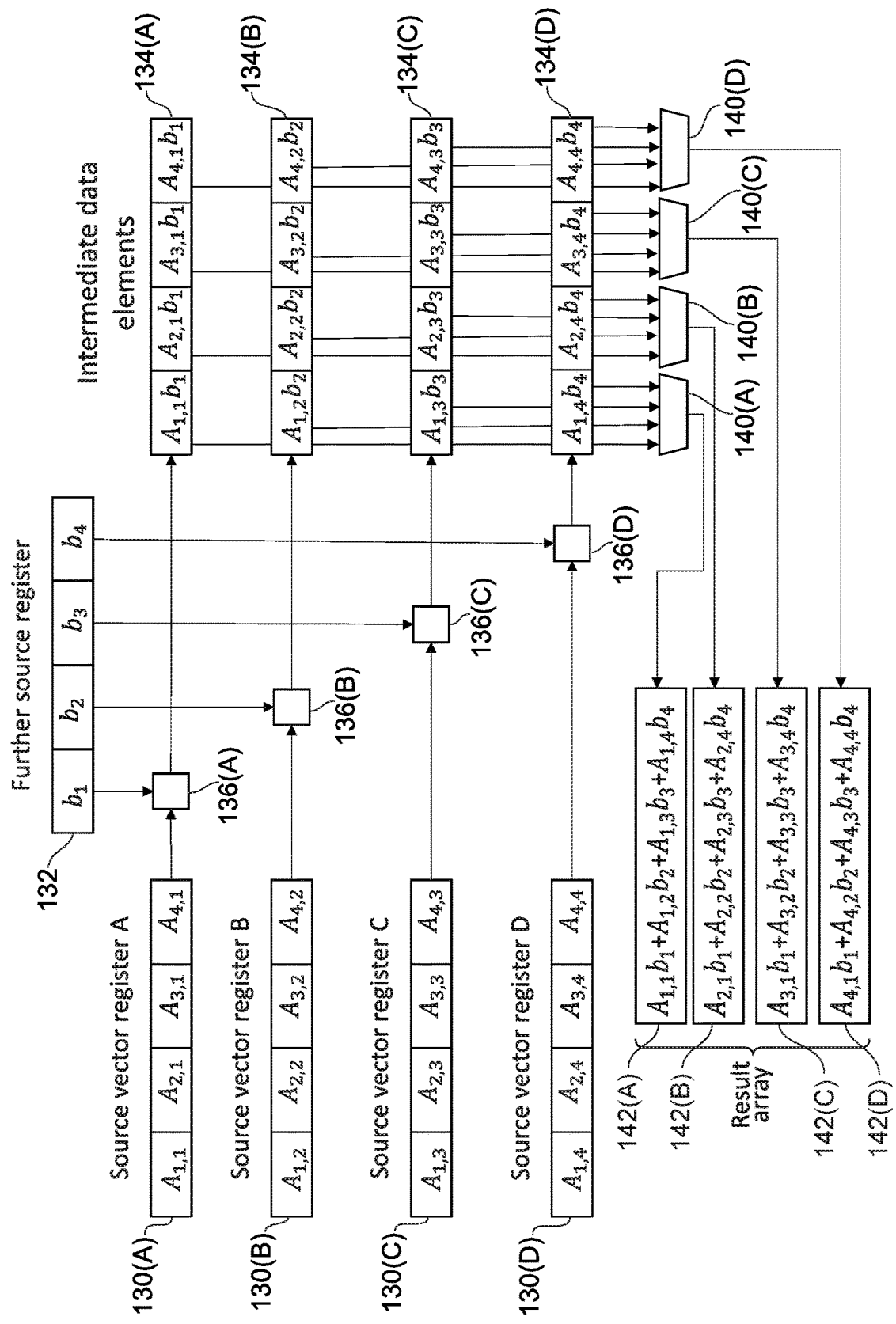
Figure 13:
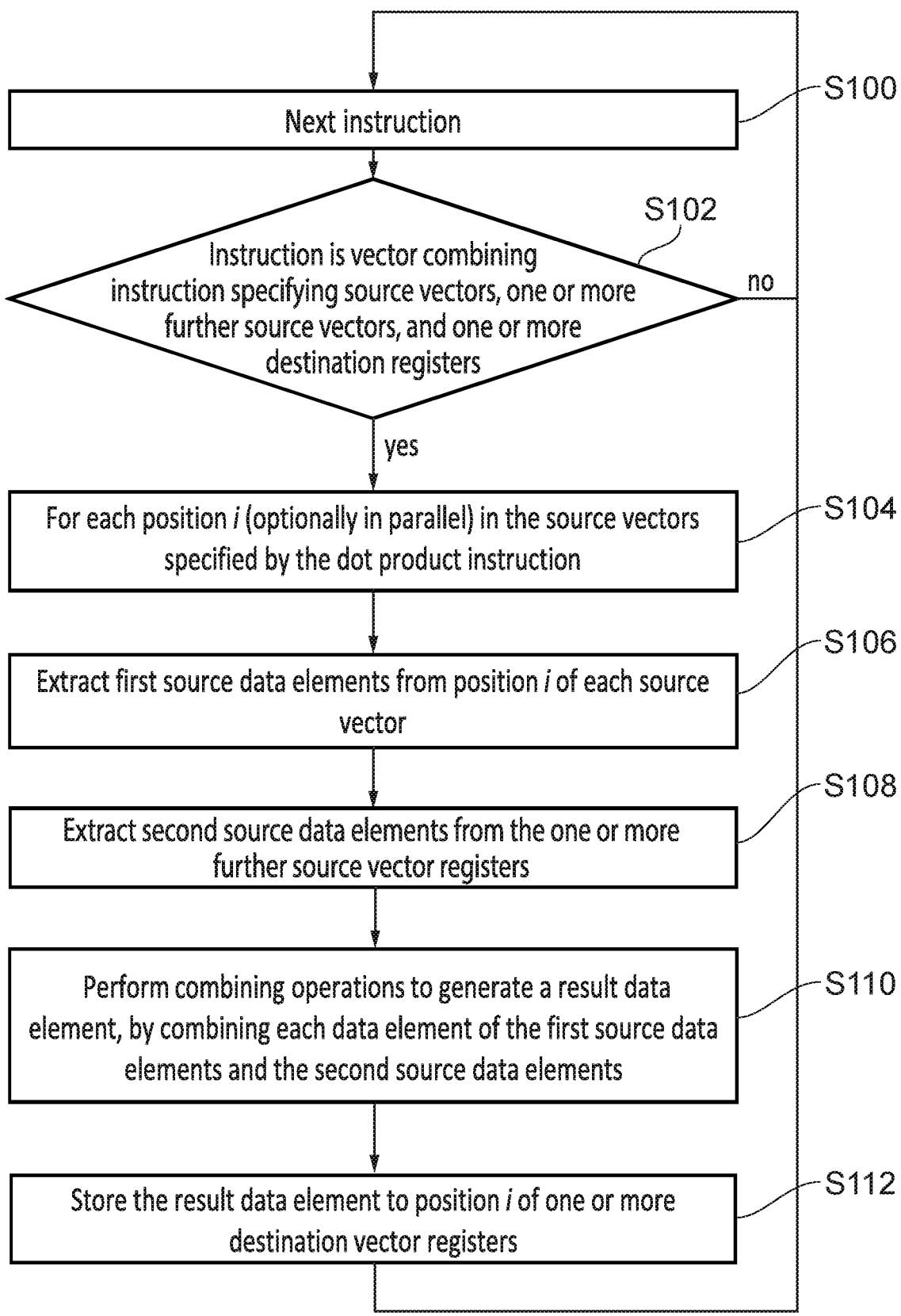
Figure 14:
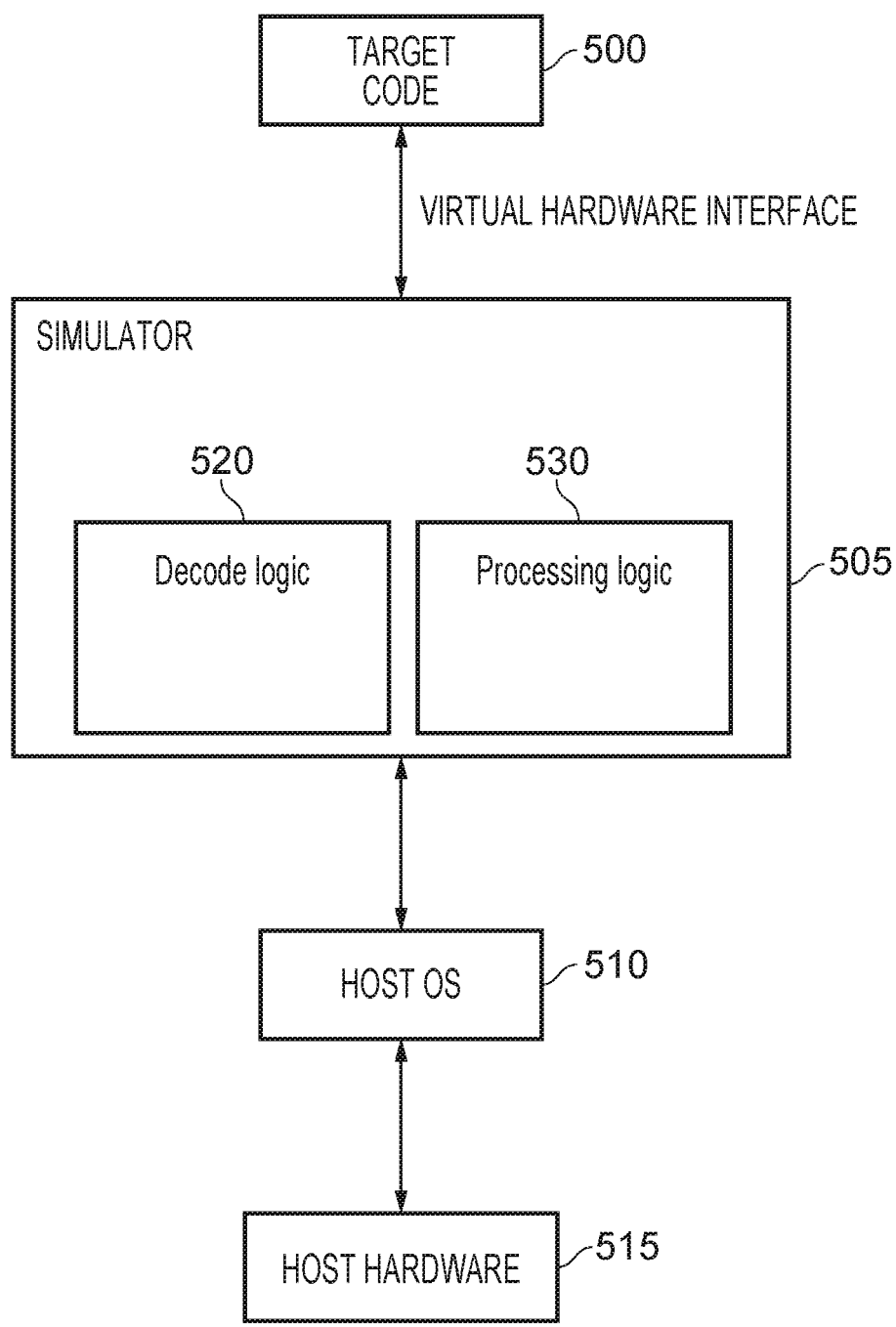

The present techniques will be described further, by way of example only, with reference to embodiments thereof as illustrated in the accompanying drawings, in which:

FIG. 1 schematically illustrates a processing apparatus according to various configurations of the present techniques;

FIG. 2 schematically illustrates further details of processing circuitry according to various configurations of the present techniques;

FIG. 3 schematically illustrates further details of processing circuitry according to various configurations of the present techniques;

FIG. 4A schematically illustrates further details of a processing apparatus used to perform a vector combining instruction according to various configurations of the present techniques;

FIG. 4B schematically illustrates further details of a processing apparatus used to perform a vector combining instruction according to various configurations of the present techniques;

FIG. 5 schematically illustrates details of vector registers and tile registers according to various configurations of the present techniques;

FIG. 6 schematically illustrates further details of processing circuitry according to various configurations of the present techniques;

FIG. 7 schematically illustrates further details of processing circuitry according to various configurations of the present techniques;

FIG. 8 schematically illustrates further details of processing circuitry according to various configurations of the present techniques;

FIG. 9 schematically illustrates further details of processing circuitry according to various configurations of the present techniques;

FIG. 10 schematically illustrates further details of processing circuitry according to various configurations of the present techniques;

FIG. 11A schematically illustrates further details of processing circuitry according to various configurations of the present techniques;

FIG. 11B schematically illustrates further details of processing circuitry according to various configurations of the present techniques;

FIG. 12 schematically illustrates further details of processing circuitry according to various configurations of the present techniques;

FIG. 13 schematically illustrates a sequence of steps carried out by a processing apparatus according to various configurations of the present techniques; and FIG. 14 schematically illustrates a simulator implementation of a processing apparatus according to various configurations of the present techniques.

Some example configurations provide a processing apparatus comprising: decode circuitry to decode instructions;

and processing circuitry to selectively apply vector processing operations specified by the instructions to input data vectors comprising a plurality of input data items at respective positions in the input data vectors. The decode circuitry is configured to, in response to a vector combining instruction specifying a plurality of source vector registers each comprising source data elements in a plurality of data element positions, one or more further source vector registers, and one or more destination registers, generate control signals. The processing apparatus is configured such that the control signals cause the processing circuitry to, for each data element position of the plurality of data element positions: extract first source data elements from the data element position of each source vector register; extract second source data elements from the one or more further source vector registers; perform combining operations to generate a result data element, wherein the result data element is calculated by combining each element of the first source data elements and the second source data elements; and store the result data element to the data element position of the one or more destination registers.

Processing apparatuses may be provided with processing circuitry to perform data processing operations on input data vectors. An input data vector has a plurality of data elements at different positions within the data vector. Some processing apparatuses are configured to perform arithmetic or logical operations to combine elements from an input data vector to generate result data elements to store in a result data vector. The inventors have realised that there is often a desire to perform specific operations repeatedly during particular types of computation. Whilst these operations can be provided by performing numerous existing instructions executed using generic processing circuitry, for example, by operating on one source element at a time, this approach can have a significant impact on performance. Hence by providing processing circuitry that has specific circuitry that is tailored to be responsive to a single vector combining instruction, a particularly efficient processing apparatus can be provided.

For this reason, the present configurations are configured to respond to a vector combining instruction. The vector combining instruction is part of an instruction set architecture which provides a complete set of instructions available to a programmer interacting with the processing circuitry. Instructions of the instruction set architecture are decoded by decoding circuitry which acts to interpret the instructions of the instruction set architecture in order to control the processing circuitry to respond to the instructions. Each vector combining instruction specifies a plurality of (i.e., two or more) source vector registers. Each of the plurality of source vector registers is made up of a plurality of data elements stored in a plurality of data element positions. Data elements of different sizes may be provided according to the particular configuration and may be flexibly adjusted based on the particular configuration. In some example configurations the vector registers are 512-bit vector registers which can for example be configured as 64 data elements of 8-bit size, 32 data elements of 16-bit size, 16 data elements of 32-bit size, 8 data elements of 64-bit size, 4 data elements of 128-bit size, or 2 data elements of 256-bit size. In other example configurations the vector registers are 256-bit vector registers which can for example be configured as: 16 data elements of 16-bit size, 32 data elements of 8-bit size, 8 data elements of 32-bit size, or 4 data elements of 64-bit size. It would be readily apparent to the skilled person that these sizes are provided as examples only and that other vector register sizes could be incorporated into the configurations described herein. The vector combining 25 instructions also specify one or more further source vector registers, the one or more further source vector registers are specified in addition to the plurality of source vector registers. The one or more further source vector registers are each made up of a further plurality of data elements in a further plurality of data element positions. The vector combining instruction also specifies one or more destination registers made up of a plurality of destination data elements in a plurality of destination data element positions. Each of the one or more further source vector registers and each of the one or more destination registers can be configured to have the same number of data elements of the same size as the plurality of source registers. Alternatively, the one or more further source vector registers and/or the one or more destination registers can be configured to hold a different number of data elements of different size to the plurality of source registers.

The decode circuitry is responsive to the vector combining instruction to cause the processing circuitry to perform a sequence of steps for each data element position of the plurality of data element positions. For example, if each source register holds N data elements, the decode circuitry causes the processing circuitry to perform the steps for data element positions 0, 1, 2, . . . , N−2, N−1. Whilst the steps are presented sequentially, this is for explanatory purpose only and any the following steps may be performed in an order different to the order specified or with multiple steps performed in parallel. The decode circuitry causes the processing circuitry to extract a set of first source data elements. Each of the first source data elements is extracted from the data element position of each source vector register. The decode circuitry also causes the processing circuitry to extract a second set of source data elements from the one or more further source vector registers. Elements of the first source data elements are extracted such that each data element is extracted from a same data element position of a different one of the plurality of source vector registers. Each of the data elements of the second source data elements is extracted from the one or more further source vector registers. However, the positions within the further source vector registers from which the second source data elements are extracted is not so limited and can be flexibly determined based on the implemented configuration. The decode circuitry is also configured to control the processing circuitry to perform combining operations to generate a result data element. The result data element is calculated by combining elements from the first source data elements and the second source data elements such that the result data element depends on each data element of the first source data elements and the second source data elements. In this way, each result data element depends on a data element extracted from the each of the plurality of source vector registers and on data elements extracted from the one or more further source vector registers. The decode circuitry also controls the processing circuitry to store the result data element to the data processing element position of the one or more destination registers. In this way the number of result data elements that are generated is equal to the number of elements in each of the plurality of source vector registers.

The combining operations are not limited and various configurations of the combining operations will be discussed below. In some example configurations the combining operations comprise: source combining operations to generate intermediate data elements, each intermediate data element generated by combining a corresponding first source data element of the first source data elements with the second source data elements; intermediate combining operations to combine the intermediate data elements to generate the result data element. The terms source combining operations and the intermediate combining operations are used to distinguish the combining operation that is performed (for example, to distinguish the mathematical or logical operations that are performed). It would be appreciated, by the person skilled in the art, that these operations may be performed by the same functional block of circuitry in parallel or by sequential blocks of circuitry operating sequentially with respect to one another. The source combining operations combine each corresponding first source data element of the first source data elements with the second source data elements to generate the intermediate data elements. Hence, each intermediate data element is dependent on the corresponding first source data element and one or more elements of the second source data elements. The combining operation can use each second source data element of the second source data elements, or only a subset of the second source data elements. As a result, a number of intermediate data elements is the same as the number of first source data elements. The combining operations also comprise intermediate combining operations that generate a result data element by combining each of the intermediate data elements together. Hence, a single result data element is generated by the intermediate combining operations (although this is repeated, sequentially or in parallel, for each data element position of the plurality of data element positions in the plurality of source vector registers.

In some configurations the source combining operations are multiplication operations; and combining the corresponding first source data element of the first source data elements with the second source data elements comprises multiplying the corresponding first source data element and a corresponding second source data element of the second source data elements to generate the intermediate data elements. The intermediate data elements therefore comprise elements that have been taken from same positions of each of the plurality of source vectors that have been multiplied by elements of the one or more further source vector registers. In these configurations, elements in the intermediate data elements can be expressed by the following equation:

$$I_{j,i} = S_{j,i} \times F_{j,i} \quad (1)$$

i.e. $I_{j,i}=S_{j,i} \times F_{j,i}$ where $I_{j,i}$ is the $i^{th}$ element of the intermediate data elements corresponding to data elements extracted from the $j^{th}$ position of each of the plurality of source vector registers, $S_{j,i}$ is the $j^{th}$ element of the $i^{th}$ source vector of the plurality of source vectors and $F_{j,i}$ is the $i^{th}$ element of the second source data elements that were extracted for combining operations involving first source data elements extracted from the $j^{th}$ data element position of the plurality of source vectors. In some configurations data elements $F_{j,i}$ are the same data elements for all values of j. In alternative configurations the elements $F_{j,i}$ are different data elements extracted from a different portion of the one or more further source vector registers for each value of j. In such configurations the one or more further source vector registers comprises a set of data elements that are each to be multiplied by one of the plurality of source vector registers in response to the vector combining instruction.

In some alternative configurations the source combining operations are scaling operations comprising: extracting one or more first scaling values from the second source data elements; extracting one or more second scaling values from the second source data elements; performing one of an addition operation to add a corresponding first scaling value of the one or more first scaling values to a corresponding first source data element of the first source data elements to generate corresponding intermediate scaled elements, and a subtraction operation to subtract the corresponding first scaling value from the corresponding first source data element to generate the corresponding intermediate scaled elements; multiplying each of the corresponding intermediate scaled elements by a corresponding second scaling value of the one or more second scaling to generate corresponding intermediate data elements of the intermediate data elements. The intermediate data elements therefore correspond to a scaling of the first source data elements (which are extracted from the first plurality of source vector registers) based on information stored in the second source data elements (and extracted from the one or more further source vector registers). In these alternative configurations, elements in the intermediate data elements can be expressed by the following equation:

$$I_{i,j} = (S_{j,i} \pm F1_i)F2_i, \quad (2)$$

i.e. $I_{i,j}=(S_{j,i} \pm F1_i)F2_i$ where $F1_i$ and $F2_i$ are the one or more first scaling values extracted from the second source data elements and the one or more second scaling values from the second source data elements respectively. The first source data values $S_{i,j}$ corresponding to the $j^{th}$ element of the $i^{th}$ source vector of the plurality of source vectors are modified through the addition or subtraction of the corresponding first scaling value (i.e., the first scaling value that is to be used for first source data elements extracted from the $i^{th}$ source vector register) and then multiplied by the corresponding second scaling value (i.e., the second scaling value that is to be used for first source data elements extracted from the $i^{th}$ source vector register). The intermediate data elements therefore correspond to scaled version of the second source data elements. Such configurations can be used to enable data elements to be stored in a compressed form in the plurality of source registers and the combining instruction can be used to first decompress the data elements before a further operation is applied (in this case the intermediate combining operation). In some configurations the one or more first scaling values could be a single first scaling value that corresponds to each of the plurality of source vector registers and the second scaling value could be a single second scaling value that corresponds to each of the plurality of source vector registers. In such configurations the intermediate data elements can be expressed using the following equation:

$$I_{i,j} = (S_{i,j} \pm F1)F2, \quad (3)$$

i.e. $I_{i,j}=(S_{j,i}+F1)F2$ where F1 and F2 are the single first scaling value and the single second scaling value respectively.

The intermediate combining operations can be variously defined and, in some configurations can be combined with source combining operations as set out in equation (1) or, in other configurations can be combined with source combining operations as set out in equation (2) or equation (3). In some example configurations the intermediate combining operations are accumulation operations; and combining the intermediate data elements to generate the result data element comprises accumulating the intermediate data elements. The intermediate combining operations therefore take, for each data element position of the plurality of data element positions of the plurality of source vector registers, all of the intermediate data elements and accumulating them to generate a single result data element. Mathematically, the accumulation operation can be expressed as:

$$R_j = \sum_i I_{j,i} \qquad (4)$$

i.e. $R_j$=SUM over all i ($I_{j,i}$) where $R_j$ is the $j^{th}$ element of the one or more destination vector registers and $I_{j,i}$ is the $i^{th}$ element of the intermediate data elements corresponding to data elements extracted from the $j^{th}$ position of each of the plurality of source vector registers as described by any of equations (1) to (3). It should be recognised that, where $I_{j,i}$ is described according to equation (1), the combining operations comprise a sequence of dot product operations where each of the first source data elements is dotted with the second source data elements. Hence, the vector combining operation acts as a plural dot product operation between a first set of vectors, where each of the first set of vectors comprises data elements from the same positions of the plurality of source vector registers, and a second vector contained in the one or more further source vector registers. As such the vector combining instruction can be used to perform a matrix-vector multiplication operation where each of the plurality of input vector registers comprise elements of a column of a matrix and the one or more further source vector registers comprises elements of the vector.

In some example configurations the intermediate data elements are first intermediate data elements, and the intermediate combining operations comprise: first intermediate combining operations to combine the first intermediate data elements to generate a second intermediate data element; and second intermediate combining operations to combine the second intermediate data element with a destination data element extracted from the data element position of the one or more destination registers. In this way the destination registers can be used to store a further set of data elements that are to be combined with the plurality of source vector registers and the one or more further source vector registers. This provides for improved flexibility of the processing apparatus when responding to the vector combining instruction.

The first intermediate combining operations and the second intermediate combining operations can be variously defined. In some example configurations the first intermediate combining operations are accumulation operations; and combining the first intermediate data elements to generate the second intermediate data element comprises accumulating the first intermediate elements. In such configurations, the second intermediate data elements can be expressed as:

$$I2_j = \sum_i I_{j,i} \qquad (5)$$

i.e. $I2_j$=SUM over all i ($I_{j,i}$) where $I2_j$ is the element of the second intermediate data elements corresponding to data elements extracted from the $j^{th}$ position of each of the plurality of source vector registers and $I_{j,i}$ is the $i^{th}$ element of the intermediate data elements corresponding to data elements extracted from the $j^{th}$ position of each of the plurality of source vector registers as described by any of equations (1) to (3).

The second intermediate combining operation can be variously defined. In some example configurations, the second intermediate combining operation is a masking operation to mask values of the second intermediate data elements, or one of a multiplication or scaling operation to scale the second intermediate data element. In some configurations the second intermediate combining operation is an accumulation operation; and combining the second intermediate data element with the destination data element comprises accumulating the second intermediate data element with the destination data element. In such configurations the result data element can be expressed as $$R_j = R_j + \sum_i I2_{j,i} \qquad (6)$$

i.e. $R_j$=Rj+SUM over all i ($I2_{j,i}$) where it is to be noted that the terminology $R_j$=$R_j$+$X_j$ is to be interpreted as meaning the value $R_j$ is generated by accumulating the existing value of $R_j$ with $X_j$. In this way the vector combining instruction can be provided, when $I2_{j,i}$ is defined based on $I_{j,i}$, as set out in equation (1), to perform a sequence of accumulating dot product operations or an accumulating matrix-vector product operation.

For configurations in which the combining operations are split as first combining operations and second combining operations, the first and second processing operations can be performed in sequence or in parallel. In some configurations, for each data element position, at least a subset of the first combining operations are performed in parallel with the second combining operations. The subset of the first combining operations can refer to a subset of each operation, such that a portion of each first combining operation is performed in parallel with a portion of the second combining operation. Alternatively, or in addition, the processing circuitry may be arranged such that the subset of the first combining operations comprises a subset of complete combining operations that are performed in parallel with complete second combining operations. For example, in configurations where the first combining operations are multiplication operations and the second combining operations are accumulating operations, the first and second combining operations can be implemented using one or more fused multiply accumulate circuits to perform a multiplication operation of the first combining operations in parallel with a combining operation of the second combining operations. In this way the combining operations can be implemented in circuitry in a compact and efficient way.

In some configurations the combining operations comprise a dot product operation to generate, as the result data element, a dot product of the first source data elements and the second source data elements. In such configurations, the dot product operation can be implemented using any dot product circuitry. In some example configurations the dot product operations can be split into first and second combining operations as set out above, whilst in other configurations the dot product operations may be carried out by a single functional circuit that incorporates all the necessary circuitry for the multiplication and addition steps of the dot product operation.

The result data elements of the one or more destination registers may be variously defined and, in some configurations, are distributed throughout the one or more destination registers. In some configurations the size of the result data elements is specified in the vector combining instruction. In some example configurations a result data element size of each result data element is equal to a source data element size of each source data element. In such configurations the one or more destination registers is a single destination register that is of a same size (number of bits and number of data elements) as each of the plurality of source vector registers. In some configurations the result data element size of each result data element is larger than a source data element size of each source data element. In such configurations the vector combining instructions are widening instructions to widen a number of bits associated with the data elements, and the result data elements are spread across plural destination registers.

For example, in some configurations source data element size is one of 8-bit and the result data element size is 32-bit; and the source data element size is 16-bit and the result data element size is 64-bit. In some configurations a number of destination registers of the one or more destination registers is determined based on a ratio of the result data element size and the source data element size. In each of the aforementioned sets of result and source data element sizes the result data element size is four times as large as the source data element size and, hence, the one or more destination registers comprise four destination registers. In this way it is possible to provide a sufficient number of bits in the one or more destination registers to enable the combining operations to be carried out without loss of precision.

The distribution of result elements in the destination register can be variously defined. In some example configurations the one or more destination registers are arranged to form a result array comprising a number of rows equal to the number of destination registers, and a number of columns equal to a number of data elements in each destination register; and result data elements are arranged in the result array in row-major order. In this way the result elements can be arranged in the one or more destination registers such that they are in the same order as an order in which they appear in the source registers. In some alternative configurations the one or more destination registers are arranged to form a result array comprising a number of rows equal to the number of destination registers, and a number of columns equal to a number of data elements in each destination register; and result data elements are arranged in the result array in column-major order. By arranging the result data elements within the one or more destination registers in this way, the result data elements are stored in a position, within the destination register, that is closer to a location from which the source data elements are extracted and, hence, a more compact design can be realised.

In some example configurations the processing circuitry uses all of the data elements in the one or more further source vector registers. However, in some configurations only a subset of the data elements of the one or more further source vector registers are used. The choice of source elements can be hard coded into the data processing apparatus. However, in some configurations the vector combining instruction specifies locations of the second source data elements in the one or more further source vector registers. This provides improved flexibility and can enable a same further source vector register to be used for plural vector combining operations. In some configurations the locations specified in the one or more further source vector registers correspond to specific locations within the one or more further source vector registers. Alternatively, the locations refer to relative locations within each of a plurality of subsections of the one or more further source vector registers. This provides a particularly efficient apparatus for performing repeated vector combining operations where a different portion of the one or more further source vector registers is used for each operation and where the locations are specified relative to the location that is read for the current instance of the operation. In some example configurations, each of the plurality of source vector registers, the one or more further source vector registers and the one or more destination registers could be divided into chunks. For example, each of the registers (including the one or more further source vector registers, the plurality of source vector registers and the destination registers) could be divided into four 128-bit chunks, and the location specified in the vector combining instruction, identifies one or more data elements, to be extracted as the second source data elements from within each of the 128-bit chunks, that are to be used (for example, by replication of the identified one or more data elements) in relation to the 128-bit chunks of each of the plurality of source vector registers. For example, if the elements are 8-bit and 4 sequential data elements are extracted from each 128-bit chunk (out of a total of 16 8-bit elements per chunk), there are 4 positions within each chunk that can be selected. In this case, the relative location can be set to (for example) the third relative location within each 128-bit chunk. In this case data elements 8-11 (i.e., from within the third position of the first 128-bit chunk) will be selected and applied in the combining operations associated with the first 128-bit chunk of data elements in the plurality of source vector registers (for example, by replicating data elements 8-11, extracted from the one or more further source vector registers, four times, or through repeated use of the same extracted data elements), the result data elements from the combination operations associated with the first 128-bit chunk will then be stored in the first 128-bit chunk of the one or more destination registers. Data elements 24-27 (i.e., from within the third position of the second 128-bit chunk) will be selected and applied in the combining operations associated with the second 128-bit chunk of data elements in the plurality of source vector registers (for example, by replicating data elements 24-27, extracted from the one or more further source vector registers, four times, or through repeated use of the same extracted data elements), the result data elements from the combination operations associated with the second 128-bit chunk will then be stored in the second 128-bit chunk of the one or more destination registers. Data elements 40-43 will be selected and applied in the combining operations associated with the third 128-bit chunk of data elements in the plurality of source vector registers (for example, by replicating data elements 40-43, extracted from the one or more further source vector registers, four times, or through repeated use of the same data elements), the result data elements from the combination operations associated with the third 128-bit chunk will then be stored in the third 128-bit chunk of the one or more destination registers. Data elements 56-59 will be selected and applied in the combining operations associated with the fourth 128-bit chunk of data elements in the plurality of source vector registers (for example, by replicating data elements 56-59, extracted from the one or more further source vector registers, four times, or through repeated use of the same data elements), the result data elements from the combination operations associated with the fourth 128-bit chunk will then be stored in the fourth 128-bit chunk of the one or more destination registers. It would be readily apparent to the person skilled in the art that 128-bit size is used as an example and any chunk size (smaller than, the same as, or larger than the size of one of the one or more further source vector registers) could be used.

Whilst the number of source vector registers and the number of source data elements used in the one or more further source vector registers can be variously defined according to any of the previously described configurations, in some example configurations the plurality of source vector registers comprises 2 source vector registers and the one or more further source vector registers each comprises 2 source data elements. In other example configurations the plurality of source vector registers comprises 4 source vector registers and the one or more further source vector registers each comprises 4 source data elements.

The numerical format of each element can be variously defined and, in some example configurations, each element of each data vector comprises one of: a signed integer value; and an unsigned integer value. Furthermore, in some example configurations each element of the further vector register comprises one of: a signed integer value; and an unsigned integer value. Hence, different configurations provide for any combination of each data vector of the plurality of source vector registers and for the further vector register. Hence, in some configurations, each element of each data vector is a signed integer value and each element of the further vector register is a signed integer value; in other configurations each element of each data vector is a signed integer value and each element of the further vector register is an unsigned integer value; in other configurations each element of each data vector is an unsigned integer value and each element of the further vector register is a signed integer value; in other example configurations each element of each data vector is an unsigned integer value and each data element of the further vector register is an unsigned integer value.

In some example configurations the processing circuitry is arranged to generate each the result data for each element position in sequence resulting in a reduced circuit footprint. In other example configurations the processing circuitry is configured to generate the result data element for each data element position in parallel. Generating the result data elements in parallel results in faster operation of the vector combining instructions with improved scalability.

As discussed, the number of second source data elements can be variously defined and may be specified as part of the vector combining instruction. However, in some configurations a number of second source data elements extracted from the one or more further source vector registers is equal to a number of sources registers in the plurality of source registers. This option is particularly useful when performing dot product operations or matrix-vector product calculations.

In some configurations the destination registers are vector registers. However, in some configurations the one or more destination registers are one or more horizontal or vertical tile slices of one or more tile registers, each of the one or more tile registers comprising a vertically and horizontally addressable two dimensional array of data elements. Conceptually tile registers are to vector registers as vector registers are to scalar registers. Tile registers provide a two dimensional array of scalar data elements and are particularly efficient for matrix-vector or matrix-matrix calculations. Each tile register can be addressed in its entirety or in terms of vertical or horizontal slices (corresponding, respectively, to a column or a row) of the tile register. By providing tile registers as the storage destination subsequent arithmetic or logical processing operations can be based on the result data elements without the requirement for further operations to reorder or rearrange the result data elements. Rather, the appropriate row or column (horizontal or vertical tile slice) can be selected from the tile register.

The method by which the second source data elements are extracted from the one or more further source vector registers can be variously defined. In some configurations the one or more further source vector registers comprises a same number of vector registers as the plurality of source vector registers; and extracting the second source data elements from the one or more further source vector registers comprises extracting the second source data elements from the data element position of each further source vector register. In such configurations, the one or more further source vector registers are treated in a same way as the plurality of source vector registers. Hence, for each data element position, the first source data elements comprise 1 element for each of the plurality of source vector registers, where the element is extracted from a same position of each of the plurality source vector registers. Similarly, for each data element position the second source data elements comprise 1 element for each of the one or more source vector registers, where the element that has been extracted from each of the one or more further source vector registers has been extracted from a same position of the one or more further source vector registers.

In some alternative configurations extracting the second source data elements from the one or more further source vector registers comprises extracting a same set of source data elements for each data element position. In such configurations it may not be necessary to repeatedly perform the step of extracting the second source data elements from the one or more further source vector registers. Rather, the extraction which is used for combining operations in each data element position of the plurality of data element positions, can be performed once. In such configurations the number of the one or more further source vector registers can be variously defined. In some configurations a plurality of further source vector registers can be defined. In other configurations the one or more further source vector registers comprises a single further source vector register. This approach provides a more compact implementation involving fewer vector registers.

Particular example configurations will now be described with reference to the accompanying figures.

FIG. 1 schematically illustrates a processing apparatus 10 which may embody various examples of the present techniques. The apparatus comprises data processing circuitry 12 which performs data processing operations on data items in response to a sequence of instructions which it executes. These instructions are retrieved from the memory 14 to which the data processing apparatus has access and, in a manner with which one of ordinary skill in the art will be familiar, fetch circuitry 16 is provided for this purpose. Furthermore, instructions retrieved by the fetch circuitry 16 are passed to the instruction decoder circuitry 18 (otherwise referred to as decode circuitry), which generates control signals which are arranged to control various aspects of the configuration and operation of the processing circuitry 12, as well as of a set of registers 20 and a load/store unit 22. Generally, the data processing circuitry 12 may be arranged in a pipelined fashion, yet the specifics thereof are not relevant to the present techniques. One of ordinary skill in the art will be familiar with the general configuration which FIG. 1 represents and further detailed description thereof is dispensed herewith merely for the purposes of brevity. The registers 20, as can be seen in FIG. 1, each comprise storage for multiple data elements, such that the processing circuitry can apply data processing operations either to a specified data element within a specified register, or can apply data processing operations to a specified group of data elements (a "vector") within a specified register. In particular, the illustrated data processing apparatus is concerned with the performance of vectorised data processing operations, and specifically to the execution of complex number processing instructions, with respect to data elements held in the registers 20, further explanation of which will follow in more detail below with reference to some specific embodiments. Data values required by the data processing circuitry 12 in the execution of the instructions, and data values generated as a result of those data processing instructions, are written to and read from the memory 14 by means of the load/store unit 22. Note also that generally the memory 14 in FIG. 1 can be seen as an example of a computer-readable storage medium on which the instructions of the present techniques can be stored, typically as part of a predefined sequence of instructions (a "program"), which the processing circuitry then executes. The processing circuitry may however access such a program from a variety of different sources, such in RAM, in ROM, via a network interface, and so on. The present disclosure describes various novel instructions which the processing circuitry 12 can execute and the figures which follow provide further explanation of the nature of these instructions, variations in the data processing circuitry in order to support the execution of those instructions, and so on.

FIG. 2 schematically illustrates further details of the processing circuitry 30 of FIG. 1 according to some example configurations. In particular, the processing circuitry 30 is provided with a plurality of source vector registers: source vector register A 32 and source vector register B 34. The processing circuitry 30 is also provided with a further source vector register 36 (in some configurations the further source vector register could be one or more further source vector registers). The processing circuitry 30 is controlled by the control signals, that were generated by the decode circuitry, to perform combining operations 40(A), 40(B), 40(C), 40(D) to generate result data elements to store to one or more destination registers. The combining operations 40(A), 40(B), 40(C), 40(D) are each performed for data elements in one of the data element positions of source vector register A 32 and source vector register B 34. Furthermore, each combining operation 40(A), 40(B), 40(C), 40(D) is based on elements of the further source vector register 36. In particular, the combining operation 40(A) takes, as inputs, elements 32(A) from source vector register A 32, element 34(A) from source vector register B 34, and elements 36(C) and 36(D) from the further source vector register 36. These elements are combined by combining operation 40(A) to generate a result data element. The combining operation 40(B) takes, as inputs, elements 32(B) from source vector register A 32, element 34(B) from source vector register B 34, and elements 36(C) and 36(D) from the further source vector register 36. These elements are combined by combining operation 40(B) to generate a result data element. The combining operation 40(C) takes, as inputs, elements 32(C) from source vector register A 32, element 34(C) from source vector register B 34, and elements 36(C) and 36(D) from the further source vector register 36. These elements are combined by combining operation 40(C) to generate a result data element. The combining operation 40(D) takes, as inputs, elements 32(D) from source vector register A 32, element 34(D) from source vector register B 34, and elements 36(C) and 36(D) from the further source vector register 36. These elements are combined by combining operation 40(D) to generate a result data element.

FIG. 3 schematically illustrates details of processing circuitry 48 according to some example configurations in which the combining operations 40 comprise source combining operations 44, 46 and intermediate combining operations 42. The source combining operations 44, 46 each combine a corresponding element of source vector register A 32 or source vector register B 34 with elements of the further source register 36. In the illustrated example the source combining operations 44, 46 take, as inputs, two elements of the further source register 36. However, it would be appreciated by the person skilled in the art that this is for illustrative purpose only and that the source combining operations 44, 46 could each take any same or different subset of elements from the further source register. The source combining operations combine data elements extracted from the source vector register A 32, the source vector register B 34 and the further source vector register 36 to generate intermediate data elements. The intermediate data elements are fed into the intermediate combining operations 42 each of which generates a result data element to be stored in one or more destination registers.

The processing circuitry 48 performs, for each element position in each of source vector register A 32 and source vector register B 34, combining operations comprising source combining operations 44 and 46 and intermediate combining operations 42. In particular, when the element position is the least significant position corresponding to data element 32(A) in source vector register A 32 and data element 34(A) in source vector register B 34, the source combining operation 44(A) combines data element 32(A) of source vector register A 32 with data elements 36(C) and 36(D) from the further source vector register 36. Similarly, the source combining operation 46(A) combines data element 34(A) of source vector register B 34 with data elements 36(D) and 36(C) from the further source vector register 36. The output of source combining operations 44(A) and 46(A) produce intermediate data elements which are fed into the intermediate combining operation 42(A) to produce a result data element to be stored to one or more destination registers.

Similarly, when the element position is the second least significant position corresponding to data element 32(B) in source vector register A 32 and data element 34(B) in source vector register B 34, the source combining operation 44(B) combines data element 32(B) of source vector register A 32 with data elements 36(C) and 36(D) from the further source vector register 36. Similarly, the source combining operation 46(B) combines data element 34(B) of source vector register B 34 with data elements 36(D) and 36(C) from the further source vector register 36. The output of source combining operations 44(B) and 46(B) produce intermediate data elements which are fed into the intermediate combining operation 42(B) to produce a result data element to be stored to one or more destination registers.

Similarly, when the element position is the second most significant position corresponding to data element 32(C) in source vector register A 32 and data element 34(C) in source vector register B 34, the source combining operation 44(C) combines data element 32(C) of source vector register A 32 with data elements 36(C) and 36(D) from the further source vector register 36. Similarly, the source combining operation 46(C) combines data element 34(C) of source vector register B 34 with data elements 36(D) and 36(C) from the further source vector register 36. The output of source combining operations 44(C) and 46(C) produce intermediate data elements which are fed into the intermediate combining operation 42(C) to produce a result data element to be stored to one or more destination registers.

Similarly, when the element position is the most significant position corresponding to data element 32(D) in source vector register A 32 and data element 34(D) in source vector register B 34, the source combining operation 44(D) combines data element 32(D) of source vector register A 32 with data elements 36(C) and 36(D) from the further source vector register 36. Similarly, the source combining operation 46(D) combines data element 34(D) of source vector register B 34 with data elements 36(D) and 36(C) from the further source vector register 36. The output of source combining operations 44(D) and 46(D) produce intermediate data elements which are fed into the intermediate combining operation 42(D) to produce a result data element to be stored to one or more destination registers.

The above described combining operations are performed by separate combining units for each of the least significant position, the second least significant position, the second most significant position, and the most significant position in source vector register A 32 and source vector register B. However, it would be appreciated by the person skilled in the art that a single set of combining circuit blocks could be provided (for example source combining elements 44(A) and 46(A) and a single intermediate combining operation 42(A)) the inputs of which could be fed, for example, through a sequence of de-multiplexors and the output the intermediate combining operation 44(A) could be multiplexed into each result element position of the one or more destination registers.

FIG. 4A schematically illustrates the use of a processing apparatus 50 configured to perform a sequence of dot-product operations in response to a vector combining instruction according to various configurations of the present techniques. The processing apparatus 50 comprises decode circuitry 56 to decode instructions and to provide control signals to processing circuitry 54. The processing apparatus 50 further comprises a sequence of registers 52 which are used to store data vectors. In the illustrated configuration the data processing apparatus 50 is used to perform a sequence of dot product operations corresponding to a matrix-vector multiplication. In particular, the data processing apparatus 50 is used to calculate the result of multiplying the matrix 58 by the vector 60. Mathematically this operation is carried out by performing a sequence of dot products to calculate the dot product of each row of the matrix 58 with the vector 60.

The matrix 58 is stored in a plurality of source vector registers comprising source vector register A 62 and source vector register B 64 such that the first column of the matrix 58 is stored in source vector register A 62 and the second column of the matrix 58 is stored in source vector register B 64. The vector 60 is stored in a single further source vector register 66. In the illustrated embodiment the two elements of the vector 60 are stored as the two least significant elements of the further source vector register 66. However, it would be appreciated by the person skilled in the art that this is for illustrative purpose only and that any positions within the further source vector register could be used interchangeably (and optionally could be specified in the vector combining instruction). The plurality of source vector registers comprising source vector register A 62 and source vector register B 64, and the further source vector register are registers that are stored as registers 52 in the register storage of the data processing apparatus 50.

The data processing apparatus 50 with the stored vector registers 52 is responsive to a vector combining instruction. The vector combining instruction is received by the decode circuitry 56 and causes the processing circuitry 54 to perform a sequence of operations for each data element position of the source vector registers. In this case, the processing circuitry performs 4 sequences of operations (optionally in parallel), one for each of the four source vector register positions. In the illustrated embodiment the combining operations comprise dot-product instructions or, alternatively, multiplication operations as source combining operations and accumulation operations as intermediate combining operations to generate the result data elements. The result data elements are (for example, as defined in the vector combining instruction) twice as wide as the source vector elements and therefore require two destination vector registers to provide sufficient storage space for the result data elements. In this case, the destination vector registers comprise result vector register A 68 comprising result data elements 68(A), 68(B) and result vector register B 70 comprising result data elements 70(A) and 70(B).

The decode circuitry 56 controls the processing circuitry 54 to generate result data element 68(B) by extracting first source data elements $A_{1,1}$ and $A_{1,2}$ from source vector register A 62 and source vector register B respectively, and extracting second source data elements $b_1$ and $b_2$ from the further source vector register 66. The decode circuitry 56 is further controls the processing circuitry 54 to combine the first source data elements and the second source data elements by performing dot product operations to generate the result data element 68(B) in which the value of the calculation $A_{1,1}b_1+A_{1,2}b_2$ is stored. Hence, this data element contains the first value of the result matrix 72 which results from multiplying the matrix 58 by vector 60.

The decode circuitry 56 controls the processing circuitry 54 to generate result data elements 68(A), 70(B) and 70(A) by performing the same sequence of operations to extract the elements from the corresponding positions of source vector register A 62 and source vector register B 64. These operations may be performed for each source vector register position in parallel or in sequence. In particular, by extracting first source data elements $A_{2,1}$ and $A_{2,2}$ from source vector register A 62 and source vector register B respectively and performing the dot product of the first source elements with the previously extracted second source elements, the processing circuitry is able to generate the result data element 68(A) stored in result vector register A 68 with a value of $A_{2,1}b_1+A_{2,2}b_2$. By extracting first source data elements $A_{3,1}$ and $A_{3,2}$ from source vector register A 62 and source vector register B respectively and performing the dot product of the first source elements with the previously extracted second source elements, the processing circuitry is able to generate the result data element 70(B) stored in result vector register B 70 with a value of $A_{3,1}b_1+A_{3,2}b_2$. By extracting first source data elements $A_{4,1}$ and $A_{4,2}$ from source vector register A 62 and source vector register B respectively and performing the dot product of the first source elements with the previously extracted second source elements, the processing circuitry is able to generate the result data element 70(A) stored in result vector register A 70 with a value of $A_{4,1}b_1+A_{4,2}b_2$.

FIG. 4B schematically illustrates a configuration in which the one or more further source vector registers comprises two further source vector registers. It would be appreciated by the person skilled in the art that, for each of the illustrated configurations, one or more further source vector registers could be specified in the vector combining instruction. In the illustrated configuration the data processing apparatus 50 is used to perform a sequence of combing operations corresponding to combine elements from two matrices. In particular, the data processing apparatus 50 is used to calculate the result of multiplying the matrix 58 by the matrix 600. Mathematically this operation is carried out by performing a sequence of dot products to calculate the dot product of each row of the matrix 58 with each row of the matrix 600.

The matrix 58 is stored in a plurality of source vector registers comprising source vector register A 62 and source vector register B 64 such that the first column of the matrix 58 is stored in source vector register A 62 and the second column of the matrix 58 is stored in source vector register B 64. The matrix 600 is stored in a plurality of further source vector registers such that the first column of the matrix 600 is stored in further source vector register A 660 and the second column of the matrix 600 is stored in further source vector register B 670. The plurality of source vector registers comprising source vector register A 62 and source vector register B 64, and the plurality of further source vector registers comprising further source vector register A 660 and further source vector register B 670 are stored as registers 52 in the register storage of the data processing apparatus 50.

The data processing apparatus 50 with the stored vector registers 52 is responsive to a vector combining instruction. The vector combining instruction is received by the decode circuitry 56 and causes the processing circuitry 54 to perform a sequence of operations for each data element position of the source vector registers. In this case, the processing circuitry performs 4 sequences of operations (optionally in parallel), one for each of the four source vector register positions. In the illustrated embodiment the combining operations comprise dot-product instructions or, alternatively, multiplication operations as source combining operations and accumulation operations as intermediate combining operations to generate the result data elements. The result data elements are (for example, as defined in the vector combining instruction) twice as wide as the source vector elements and therefore require two destination vector registers to provide sufficient storage space for the result data elements. In this case, the destination vector registers comprise result vector register A 68 comprising result data elements 68(A), 68(B) and result vector register B 70 comprising result data elements 70(A) and 70(B).

The decode circuitry 56 controls the processing circuitry 54 to generate result data element 68(B) by extracting first source data elements $A_{1,1}$ and $A_{1,2}$ from source vector register A 62 and source vector register B respectively, and extracting second source data elements $B_{1,1}$ and $B_{1,2}$ from further source vector register A 660 and further source vector register B 670 respectively. The decode circuitry 56 is further controls the processing circuitry 54 to combine the first source data elements and the second source data elements by performing dot product operations to generate the result data element 68(B) in which the value of the calculation $A_{1,1}B_{1,1}+A_{1,2}B_{1,2}$ is stored. Hence, this data element contains the first value of the result matrix 72 which results from multiplying the matrix 58 by vector 60.

The decode circuitry 56 controls the processing circuitry 54 to generate result data elements 68(A), 70(B) and 70(A) by performing the same sequence of operations to extract the elements from the corresponding positions of source vector register A 62, source vector register B 64, further source vector register A 660, and further source vector register B 670. These operations may be performed for each source vector register position in parallel or in sequence. In particular, by extracting first source data elements $A_{2,1}$ and $A_{2,2}$ from source vector register A 62 and source vector register B respectively and performing the dot product of the first source elements with second source elements $B_{2,1}$ and $B_{2,2}$ extracted from further source vector register A 660 and further source vector register B 670, the processing circuitry is able to generate the result data element 68(A) stored in result vector register A 68 with a value of $A_{2,1}B_{2,1}+A_{2,2}B_{2,2}$. By extracting first source data elements $A_{3,1}$ and $A_{3,2}$ from source vector register A 62 and source vector register B respectively and performing the dot product of the first source elements with second source elements $B_{3,1}$ and $B_{3,2}$ extracted from further source vector register A 660 and further source vector register B 670, the processing circuitry is able to generate the result data element 70(B) stored in result vector register B 70 with a value of $A_{3,1}B_{3,1}+A_{3,2}B_{3,2}$. By extracting first source data elements $A_{4,1}$ and $A_{4,2}$ from source vector register A 62 and source vector register B respectively and performing the dot product of the first source elements with second source elements $B_{4,1}$ and $B_{4,2}$ extracted from further source vector register A 660 and further source vector register B 670, the processing circuitry is able to generate the result data element 70(A) stored in result vector register B 70 with a value of $A_{4,1}B_{4,1}+A_{4,2}B_{4,2}$.

FIG. 5 schematically illustrates further details of the registers provided for a data processing apparatus 80 in accordance with various example configurations. In addition to the decode circuitry 92 and processing circuitry 90 as described above, the processing apparatus 80 is provided with vector register storage 82 and tile register storage 86. The vector register storage 82 comprises N vector registers 84(1), 84(2), ..., 84(N). The tile register storage 86 comprises tile registers 88(1), ..., 88(M). The number of vector and tile registers provided may vary depending on the configuration. Each vector register comprises a plurality of elements and can be addressed on a vector register basis or on a vector element basis. The tile registers 88 are arranged as a two-dimensional array of elements. Each tile register can be addressed on a tile basis, an element basis, or in terms of a row (horizontal slice) or a column (vertical slice) of the tile register.

FIG. 6 schematically illustrates the operation of processing circuitry according to various example configurations of the present techniques. In the illustrated configuration the combining operations comprise first combining operations which are multiplication operations 96, 98 and second combining operations which are addition operations 100. The processing circuitry is responsive to the vector combining instruction to combine a plurality of source vector registers comprising source vector register A 90 and source vector register B 92, and the further source vector register 94. The processing circuitry is configured to output result elements to result vector register A 102 which comprises a same number of elements of the same size as each of the source vector registers 90, 92. In operation the processing circuitry performs multiplication operations 98 to combine elements of source vector register A 90 with element $b_1$ of the further source vector register 94 and multiplication operations 96 to combine elements of source vector register B 92 with element $b_2$ of the further source vector register 94. The results of corresponding sets of the multiplication operations are combined through an accumulation operation 100 to produce the result data elements which are stored in result vector register A 102.

The processing circuitry of FIG. 6 provides circuitry to perform four sets of combing operations, each associated with one of the result data elements (and identified by the letter included in parentheses at the end of the reference numeral). The most significant (leftmost) result data element is generated from the most significant elements of source vector register A 90 and source vector register B 92 combined with the corresponding elements of the further source vector register 94 using multiplication operations 96(D) and 98(D), and accumulation operation 100(D) to combine the outputs of multiplication operations 96(D) and 98(D). Similarly, the second most significant element of the result vector register 102 is generated from the second most significant elements of source vector register A 90 and source vector register B 92 combined with the corresponding elements of the further source vector register 94 using multiplication operations 96(C) and 98(C), and accumulation operation 100(C) to combine the outputs of multiplication operations 96(C) and 98(C). Similarly, the second least significant element of the result vector register 102 is generated from the second least significant elements of source vector register A 90 and source vector register B 92 combined with the corresponding elements of the further source vector register 94 using multiplication operations 96(B) and 98(B), and accumulation operation 100(B) to combine the outputs of multiplication operations 96(B) and 98(B). Finally, the least significant (rightmost) result data element is generated from the least significant elements of source vector register A 90 and source vector register B 92 combined with the corresponding elements of the further source vector register 94 using multiplication operations 96(A) and 98(A), and accumulation operation 100(A) to combine the outputs of multiplication operations 96(A) and 98(A).

FIG. 7 schematically illustrates details of operations carried out by the processing circuitry in accordance with various example configurations. The processing circuitry of FIG. 7 comprises source combining operations are identical to those described in relation to FIG. 6. The intermediate combining operations of FIG. 6 comprise first intermediate combining operations 100 which are identical to the intermediate combining operations 100 of FIG. 6. In addition, the processing circuitry of FIG. 7 is provided with second intermediate combining operations 104 which, in the illustrated embodiment, are accumulation operations. The second intermediate combining operations combine the output from the first intermediate combining operations 100 with a value of a data element that is already present in the destination vector register 102. The result data elements of the result vector register 102 are each of a same size as the data elements of the source vector registers 90, 92.

The processing circuitry of FIG. 7 provides circuitry to perform four sets of combing operations, each associated with one of the result data elements. The least significant result data element is generated from the least significant elements of source vector register A 90 and source vector register B 92 combined with the corresponding elements of the further source vector register 94 using multiplication operations 96(D) and 98(D), and accumulation operation 100(D) to combine the outputs of multiplication operations 96(D) and 98(D), and accumulation operation 104(D) to accumulate the output of accumulation operation 100(D) and the existing value in result vector register 102. Similarly, the second least significant element of the result vector register 102 is generated from the second least significant elements of source vector register A 90 and source vector register B 92 combined with the corresponding elements of the further source vector register 94 using multiplication operations 96(C) and 98(C), and accumulation operation 100(C) to combine the outputs of multiplication operations 96(C) and 98(C), and accumulation operation 104(C) to accumulate the output of accumulation operation 100(C) and the existing value in result vector register 102. Similarly, the second most significant element of the result vector register 102 is generated from the second most significant elements of source vector register A 90 and source vector register B 92 combined with the corresponding elements of the further source vector register 94 using multiplication operations 96(B) and 98(B), and accumulation operation 100(B) to combine the outputs of multiplication operations 96(B) and 98(B), and accumulation operation 104(B) to accumulate the output of accumulation operation 100(B) and the existing value in result vector register 102. Finally, the most significant result data element is generated from the most significant elements of source vector register A 90 and source vector register B 92 combined with the corresponding elements of the further source vector register 94 using multiplication operations 96(A) and 98(A), and accumulation operation 100(A) to combine the outputs of multiplication operations 96(A) and 98(A), and accumulation operation 104(A) to accumulate the output of accumulation operation 100(A) and the existing value in result vector register 102. The accumulation operations 100 and 104, and the multiplication operations 96 and 98 can be provided as discrete separate logical blocks or a single combined circuit that performs the steps of accumulation and multiplication as described with reference to each of the accumulation operations 100 and 104, and the multiplication operations 96 and 98. Furthermore, a single complete set of accumulation and multiplication circuits could be provided, for example multiplication circuits 96(A) and 98(A) and accumulation units 100(A) and 104(A) for performing the above described steps sequentially with the operands from source vector register A and source vector register B selected using a switch (de-multiplexor) and the result data elements fed to the corresponding positions in the destination register using a switch (multiplexor).

FIG. 8 schematically illustrates details of operations carried out by the processing circuitry in accordance with various example configurations. The processing circuitry of FIG. 8 comprises source combining operations and intermediate combining operations as described in relation to FIG. 6. The intermediate combining operations could equally comprise the second intermediate combining operations described in relation to FIG. 7. The processing circuitry is configured to generate result data elements that are twice as wide as the data elements of the input source registers 90, 92. The result data elements are stored in destination register A 106 and destination register B 108. Destination register A 106 and destination register B 108 are arranged to form a result array comprising a number of rows equal to the number of destination registers, and a number of columns equal to a number of data elements in each destination register. Furthermore, the processing circuitry is configured to arrange the result data elements in the result array in row-major order. In particular, result data elements associated with elements $A_{1,2}$ and $A_{2,2}$ of source register B 92 and elements $A_{1,1}$ and $A_{2,1}$ of source register A 90 are stored in destination register A 106. Similarly, result data elements associated with elements $A_{3,2}$ and $A_{4,2}$ of source register B 92 and elements $A_{3,1}$ and $A_{4,1}$ of source register A 90 are stored in destination register B 108.

FIG. 9 schematically illustrates details of operations carried out by the processing circuitry in accordance with various example configurations. The processing circuitry of FIG. 9 comprises source combining operations and intermediate combining operations that are identical to those described in relation to FIGS. 6 and 8. The processing circuitry is configured to generate result data elements that are twice as wide as the data elements of the input source registers 90, 92. The result data elements are stored in destination register A 106 and destination register B 108. Destination register A 106 and destination register B 108 are arranged to form a result array comprising a number of rows equal to the number of destination registers, and a number of columns equal to a number of data elements in each destination register. Furthermore, the processing circuitry is configured to arrange the result data elements in the result array in column-major order. In particular, result data elements associated with elements $A_{1,2}$ and $A_{3,2}$ of source register B 92 and elements $A_{1,1}$ and $A_{3,1}$ of source register A 90 are stored in destination register A 106. Similarly, result data elements associated with elements $A_{2,2}$ and $A_{4,2}$ of source register B 92 and elements $A_{2,1}$ and $A_{4,1}$ of source register A 90 are stored in destination register B 108.

FIG. 10 schematically illustrates details of operations carried out by the processing circuitry in accordance with various example configurations. The processing circuitry of FIG. 10 comprises source combining operations and intermediate combining operations that are functionally equivalent to the source combining operations and intermediate combining operations described in relation to FIGS. 6, 8 and 9. It is noted that, in some configurations, the intermediate combining operations of FIG. 10 could also be modified to incorporate the second intermediate combining operations described in relation to FIG. 7. The processing circuitry of FIG. 10 differs from the preceding embodiments in that at least a subset of the source combining operations are performed in parallel with the intermediate combining operations. In particular, the source combining operations are multiplication operations and the intermediate combining operations are accumulation operations. The source combining operations 96 that are associated with source vector register B 92 are performed as multiplication operations taking two inputs, one from source vector register B 92 and one from the further source vector register 94. The source combining operations associated with source vector register A 90 and the intermediate combining operations are each performed in parallel by the fused multiply accumulate (FMA) units 110. Each fused multiply accumulate unit 110 comprises circuitry to perform multiplications 112 and circuitry to perform accumulations 114. Fused multiply accumulation unit 110(A) takes inputs from the source combining operation 96(A) and source vector A 90 and outputs a result data element to destination register A 106. Fused multiply accumulation unit 110(B) takes inputs from the source combining operation 96(B) and source vector A 90 and outputs a result data element to destination register A 106. Fused multiply accumulation unit 110(C) takes inputs from the source combining operation 96(C) and source vector A 90 and outputs a result data element to destination register B 108. Fused multiply accumulation unit 110(D) takes inputs from the source combining operation 96(D) and source vector A 90 and outputs a result data element to destination register B 108. In the illustrated embodiment the result elements are output in a row-major order as discussed in relation to FIG. 8. However, it would be appreciated by the person skilled in the art that the data elements could be output in column-major order to the destination registers 106, 108, which could also be configured to store result data elements of any size, and that the intermediate combining operations could also comprise second intermediate combining operation to accumulate the results into the destination registers 106 108.

FIGS. 11A and 11B schematically illustrate details of processing apparatuses according to the present techniques in which scaling operations are performed. FIG. 11A schematically illustrates a case in which a single set of scaling values are specified in the instruction and FIG. 11B schematically illustrates a case in which one set of scaling values is provided for each input vector register.

FIG. 11A schematically illustrates details of operations carried out by the processing circuitry according to various configurations of the present techniques. In the illustrated embodiment, the processing circuitry comprises source combining operations and intermediate combining operations where the source combining operations are scaling operations involving addition/subtraction operations 116, 118, and multiplication operations 120, 122. The operations are performed for each data element position in the plurality of source vector registers, i.e., source vector register A 90 and source vector register B 92. Each set of operations (which are identified by a same letter in parentheses at the end of the reference numerals) comprises extracting first source data elements from the position of each of the plurality of source vector registers and second source data elements from the further source vector register 94. The operations involve extracting a first scaling value (in this case $b_2$) from the second source data elements extracted from the further source vector register 94. The first scaling value is input into the addition/subtraction units 116, 118 along with one of the first source data elements. Each first source data element is scaled through addition/subtraction of the first scaling value by addition/subtraction units 116, 118. The operations further involve extracting a second scaling value from the second source data elements (in this case $b_1$). The result of the addition/subtraction operations 116, 118 is fed into multiplication units 120, 122 to multiply the result of the addition/subtraction operation by the second scaling value to generate the intermediate data elements. The intermediate data elements are fed into combining units 124 which perform an intermediate combining operation to combine the outputs of the multiplication units 120, 122. The intermediate combining operation that is performed can be any of the operations described herein. For example, the intermediate combining operation could be a multiplication, an accumulation operation or another mathematical or logical operation. The output from the accumulation operations 124 stored in the destination registers 106, 108.

The element $A_{4,2}$, from the least significant position of source vector register A 90, is combined with the first scaling value, $b_2$, using addition/subtraction unit 116(D) to generate an intermediate scaled element. The intermediate scaled element is combined with the second scaling value, $b_1$, using multiplication unit 120(D) to generate an intermediate data element. Similarly, the element $A_{4,1}$, from the least significant position of source vector register B 92, is combined with the first scaling value, $b_2$, using addition/subtraction unit 118(D) to generate an intermediate scaled element. The intermediate scaled element is combined with the second scaling value, $b_1$, using multiplication unit 122(D) to generate an intermediate data element. The intermediate data elements output by multiplication unit 120(D) and multiplication unit 122(D) are combined through combining operation 124(D) to generate a result data element $(A_{4,2} \perp b_2)b_1 \otimes (A_{4,1} \perp b_2)b_1$ stored in destination register B 108, where $\otimes$ is used to denote any combining operation.

The element $A_{3,2}$, from the least significant position of source vector register A 90, is combined with the first scaling value, $b_2$, using addition/subtraction unit 116(C) to generate an intermediate scaled element. The intermediate scaled element is combined with the second scaling value, $b_1$, using multiplication unit 120(C) to generate an intermediate data element. Similarly, the element $A_{3,1}$, from the least significant position of source vector register B 92, is combined with the first scaling value, $b_2$, using addition/subtraction unit 118(C) to generate an intermediate scaled element. The intermediate scaled element is combined with the second scaling value, $b_1$, using multiplication unit 122(C) to generate an intermediate data element. The intermediate data elements output by multiplication unit 120(C) and multiplication unit 122(C) are combined through combining operation 124(C) to generate a result data element $(A_{3,2} \pm b_2) b_1 \otimes (A_{3,1} \pm b_2) b_1$ stored in destination register B 108.

The element $A_{2,2}$, from the least significant position of source vector register A 90, is combined with the first scaling value, $b_2$, using addition/subtraction unit 116(B) to generate an intermediate scaled element. The intermediate scaled element is combined with the second scaling value, $b_1$, using multiplication unit 120(B) to generate an intermediate data element. Similarly, the element $A_{2,1}$, from the least significant position of source vector register B 92, is combined with the first scaling value, $b_2$, using addition/subtraction unit 118(B) to generate an intermediate scaled element. The intermediate scaled element is combined with the second scaling value, $b_1$, using multiplication unit 122(B) to generate an intermediate data element. The intermediate data elements output by multiplication unit 120(B) and multiplication unit 122(B) are combined through combining operation 124(B) to generate a result data element $(A_{2,2} \pm b_2) b_1 \otimes (A_{2,1} \pm b_2) b_1$ stored in destination register A 108.

The element $A_{1,2}$, from the least significant position of source vector register A 90, is combined with the first scaling value, $b_2$, using addition/subtraction unit 116(A) to generate an intermediate scaled element. The intermediate scaled element is combined with the second scaling value, $b_1$, using multiplication unit 120(A) to generate an intermediate data element. Similarly, the element $A_{1,1}$, from the least significant position of source vector register B 92, is combined with the first scaling value, $b_2$, using addition/subtraction unit 118(A) to generate an intermediate scaled element. The intermediate scaled element is combined with the second scaling value, $b_1$, using multiplication unit 122(A) to generate an intermediate data element. The intermediate data elements output by multiplication unit 120(A) and multiplication unit 122(A) are combined through combining operation 124(A) to generate a result data element $(A_{1,2} \pm b_2) b_1 \otimes (A_{1,1} \pm b_2) b_1$ stored in destination register A 108.

In the configuration illustrated in FIG. 11A each of source vector register A 90 and source vector register B is scaled by a same first scaling value and the same second scaling value. In the alternative configuration, illustrated in FIG. 11B, source vector register A 90 is scaled by corresponding first scaling value $b_4$ and corresponding second scaling value $b_3$ whilst source vector register B 92 is scaled by corresponding first scaling value $b_2$ and corresponding second scaling value $b_1$. Scaling values $b_1$, $b_2$, $b_3$, and $b_4$ are each stored in the further source vector register 94. In alternative configurations the first scaling values $b_2$ and $b_4$ could be stored in one further source vector register and the second scaling values $b_1$ and $b_3$ could be stored in a different further source vector register. In other configurations each of the four scaling values could be stored in a separate source vector register.

The operation of the circuit illustrate in FIG. 11B is similar to the circuit described in relation to FIG. 11A.

In FIG. 11B the element $A_{4,2}$, from the least significant position of source vector register A 90, is combined with corresponding first scaling value, $b_2$, using addition/subtraction unit 116(D) to generate an intermediate scaled element. The intermediate scaled element is combined with corresponding second scaling value, $b_1$, using multiplication unit 120(D) to generate an intermediate data element. Similarly, the element $A_{4,1}$, from the least significant position of source vector register B 92, is combined with corresponding first scaling value, $b_4$, using addition/subtraction unit 118(D) to generate an intermediate scaled element. The intermediate scaled element is combined with corresponding second scaling value, $b_3$, using multiplication unit 122(D) to generate an intermediate data element. The intermediate data elements output by multiplication unit 120(D) and multiplication unit 122(D) are combined through combining operation 124(D) to generate a result data element $(A_{4,2} \pm b_2) b_1 \otimes (A_{4,1} \pm b_4) b_2$ stored in destination register B 108, where $\otimes$ is used to denote any combining operation.

The element $A_{3,2}$, from the least significant position of source vector register A 90, is combined with corresponding first scaling value, $b_2$, using addition/subtraction unit 116(C) to generate an intermediate scaled element. The intermediate scaled element is combined with corresponding second scaling value, $b_1$, using multiplication unit 120(C) to generate an intermediate data element. Similarly, the element $A_{3,1}$, from the least significant position of source vector register B 92, is combined with corresponding first scaling value, $b_4$, using addition/subtraction unit 118(C) to generate an intermediate scaled element. The intermediate scaled element is combined with corresponding second scaling value, $b_3$, using multiplication unit 122(C) to generate an intermediate data element. The intermediate data elements output by multiplication unit 120(C) and multiplication unit 122(C) are combined through combining operation 124(C) to generate a result data element $(A_{3,2} \pm b_2) b_1 \otimes (A_{3,1} \pm b_4) b_2$ stored in destination register B 108.

The element $A_{2,2}$, from the least significant position of source vector register A 90, is combined with corresponding first scaling value, $b_2$, using addition/subtraction unit 116(B) to generate an intermediate scaled element. The intermediate scaled element is combined with corresponding second scaling value, $b_1$, using multiplication unit 120(B) to generate an intermediate data element. Similarly, the element $A_{2,1}$, from the least significant position of source vector register B 92, is combined with corresponding first scaling value, $b_4$, using addition/subtraction unit 118(B) to generate an intermediate scaled element. The intermediate scaled element is combined with corresponding second scaling value, $b_3$, using multiplication unit 122(B) to generate an intermediate data element. The intermediate data elements output by multiplication unit 120(B) and multiplication unit 122(B) are combined through combining operation 124(B) to generate a result data element $(A_{2,2} \pm b_2) b_1 \otimes (A_{2,1} \pm b_4) b_3$ stored in destination register A 108.

The element $A_{1,2}$, from the least significant position of source vector register A 90, is combined with corresponding first scaling value, $b_2$, using addition/subtraction unit 116(A) to generate an intermediate scaled element. The intermediate scaled element is combined with corresponding second scaling value, $b_1$, using multiplication unit 120(A) to generate an intermediate data element. Similarly, the element $A_{1,1}$, from the least significant position of source vector register B 92, is combined with corresponding first scaling value, $b_2$, using addition/subtraction unit 118(A) to generate an intermediate scaled element. The intermediate scaled element is combined with corresponding second scaling value, $b_1$, using multiplication unit 122(A) to generate an intermediate data element. The intermediate data elements output by multiplication unit 120(A) and multiplication unit 122(A) are combined through combining operation 124(A) to generate a result data element $(A_{1,2} \pm b_2)b_1 \otimes (A_{1,1} \pm b_4)b_3$ by DAME stored in destination register A 108.

FIG. 12 schematically illustrates further details of operations carried out by the processing circuitry in accordance with various configurations of the present techniques. The vector combining operation of FIG. 12 combines data elements from a plurality of source vector registers 130 and a further source vector register 132. Each source vector register 130 is combined with a different element of the further source register 132 using the combining circuitry 136. In this case the combining operations are multiplication operations and result in intermediate data elements 134. Source vector register A 130(A) is multiplied by the most significant (leftmost) element of the further source vector register 132 using combining circuitry 136(A) to produce intermediate data elements 134(A). Source vector register B 130(B) is multiplied by the second most significant element of the further source vector register 132 using combining circuitry 136(B) to produce intermediate data elements 134(B). Source vector register C 130(C) is multiplied by the second least significant element of the further source vector register 132 using combining circuitry 136(C) to produce intermediate data elements 134(C). Source vector register D 130(D) is multiplied by the least significant (rightmost) element of the further source vector register 132 using combining circuitry 136(D) to produce intermediate data elements 134(D). The intermediate data elements can be elements of the same width as the elements of the plurality of source vector registers or might be wider than the source data elements.

The intermediate data elements 134 are combined using the intermediate combining circuitry 140. In the illustrated embodiment the combining operations are accumulation operations. The intermediate combining circuitry 140(A) combines the most significant elements of each set of intermediate data elements 134 to generate the result data element 142(A). The intermediate combining circuitry 140(B) combines the second most significant elements of each set of intermediate data elements 134 to generate the result data element 142(B). The intermediate combining circuitry 140(C) combines the second least significant elements of each set of intermediate data elements 134 to generate the result data element 142(C). The intermediate combining circuitry 140(D) combines the least significant elements of each set of intermediate data elements to generate the result data element 142(D). The resulting data elements generated in this way correspond to a sequence of dot products operations carried out between vectors formed from elements of the same element position in the source vector registers 130 and the further source vector register 132. The result data elements are stored to a result array 142 which could be an array of vector registers or an array of horizontal or vertical slices of one or more tile registers.

FIG. 13 schematically illustrates a sequence of steps carried out by the processing apparatus in response to a sequence of instructions. Flow begins at step S100 where a next instruction is received by the decode circuitry. The flow then proceeds to step S102 where it is determined if the instruction that has been received is a vector combining instruction specifying a plurality of source vector registers, one or more further source vector registers and one or more destination registers. If it is determined that the instruction is not a vector combining instruction, then the instruction will be issued by the decode circuitry based on the particular instruction and the requirements of the instruction set architecture to which it belongs before flow returns to step S100 to await the next instruction. If, at step S102, it was determined that the instruction is a vector combining instruction then flow proceeds to step S104 where, for each position i of the source vectors a sequence of steps are performed (optionally in parallel). Flow proceeds (for each position i) to step S106 where first source data elements are extracted from position i of each of the plurality of source vector registers. Flow then proceeds to step S108 where second source data elements are extracted from the one or more further source vector registers. Flow then proceeds to step S110 where combining operations are performed to generate a result data element. The combining operations involve combining each data element of the first source data elements and the second source data elements. Flow then proceeds to step S112 where the result data element is stored to position i of the one or more destination vector registers. Flow then returns to step S100 to await the next instruction.

FIG. 14 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on host hardware 515, optionally running a host operating system (host OS) 510, supporting the simulator program 505. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 505 may be stored on a computer-readable storage medium (which may be a non-transitory medium), and provides a program interface (instruction execution environment) to the target code 500 which is the same as the application program interface of the hardware architecture being modelled by the simulator program 505. The simulator program 505 includes decode logic 520 to decode instructions; and processing logic 530 to selectively apply vector processing operations specified by the instructions to input data vectors comprising a plurality of input data items at respective positions in the input data vectors. The decode logic 520 is configured to, in response to a vector combining instruction specifying a plurality of source vector registers each comprising source data elements in a plurality of data element positions, one or more further source vector registers, and one or more destination registers, generate control signals to cause the processing logic 530 to, for each data element position of the plurality of data element positions: extract first source data elements from the data element position of each source vector register; extract second source data elements from the one or more further source vector registers; perform combining operations to generate a result data element, wherein the result data element is calculated by combining each element of the first source data elements and the second source data elements; and store the result data element to the data element position of the one or more destination registers. Thus, the program instructions of the target code 500, including the complex number processing instructions described above, may be executed from within the instruction execution environment using the simulator program 505, so that the host hardware 515 which does not actually include the hardware features of the apparatus discussed above can emulate these features.

In brief overall summary there is provided a processing apparatus, method and computer program. The apparatus comprising: decode circuitry to decode instructions; and processing circuitry to apply vector processing operations specified by the instructions. The decode circuitry is configured to, in response to a vector combining instruction specifying a plurality of source vector registers each comprising source data elements in a plurality of data element positions, one or more further source vector registers, and one or more destination registers, cause the processing circuitry to, for each data element position: extract first source data elements from the data element position of each source vector register; extract second source data elements from the one or more further source vector registers; generate a result data element by combining each element of the first source data elements and the second source data elements; and store the result data element to the data element position of the one or more destination registers.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A processing apparatus comprising:
decode circuitry configured to decode instructions; and
processing circuitry configured to selectively apply vector processing operations specified by the instructions to input data vectors comprising a plurality of input data items at respective positions in the input data vectors,
wherein the decode circuitry is configured to, in response to a vector combining instruction specifying a plurality of source vector registers each comprising source data elements in a plurality of data element positions, one or more further source vector registers, and one or more destination registers, generate control signals to cause the processing circuitry to, for each data element position of the plurality of data element positions:
extract first source data elements from the data element position of each source vector register;
extract second source data elements from the one or more further source vector registers;
perform combining operations to generate a result data element, wherein the result data element is calculated by combining each element of the first source data elements and the second source data elements; and
store the result data element to the data element position of the one or more destination registers,
wherein the combining operations comprise:
source combining operations to generate intermediate data elements, each intermediate data element generated by combining a corresponding first source data element of the first source data elements with the second source data elements, and
intermediate combining operations to combine the intermediate data elements to generate the result data element.

2. The processing apparatus of claim 1, wherein
the source combining operations are multiplication operations; and
combining the corresponding first source data element of the first source data elements with the second source data elements comprises multiplying the corresponding first source data element and a corresponding second source data element of the second source data elements to generate the intermediate data elements.

3. The processing apparatus of claim 1, wherein the source combining operations are scaling operations comprising:
extracting one or more first scaling values from the second source data elements;
extracting one or more second scaling values from the second source data elements;
performing one of an addition operation to add a corresponding first scaling value of the one or more first scaling values to a corresponding first source data element of the first source data elements to generate corresponding intermediate scaled elements, and a subtraction operation to subtract the corresponding first scaling value from the corresponding first source data element to generate the corresponding intermediate scaled elements;

multiplying each of the corresponding intermediate scaled elements by a corresponding second scaling value of the one or more second scaling values to generate corresponding intermediate data elements of the intermediate data elements.

4. The processing apparatus of claim 1, wherein:
the intermediate combining operations are accumulation operations; and
combining the intermediate data elements to generate the result data element comprises accumulating the intermediate data elements.

5. The processing apparatus of claim 1, wherein the intermediate data elements are first intermediate data elements, and the intermediate combining operations comprise:
first intermediate combining operations to combine the first intermediate data elements to generate a second intermediate data element; and
second intermediate combining operations to combine the second intermediate data element with a destination data element extracted from the data element position of the one or more destination registers.

6. The processing apparatus of claim 5, wherein:
the first intermediate combining operations are accumulation operations; and
combining the first intermediate data elements to generate the second intermediate data element comprises accumulating the first intermediate elements.

7. The processing apparatus of claim 5, wherein:
the second intermediate combining operation is an accumulation operation; and
combining the second intermediate data element with the destination data element comprises accumulating the second intermediate data element with the destination data element.

8. The processing apparatus of claim 1, wherein for each data element position, at least a subset of the source combining operations are performed in parallel with the intermediate combining operations.

9. The processing apparatus of claim 1, wherein the combining operations comprise a dot product operation to generate, as the result data element, a dot product of the first source data elements and the second source data elements.

10. The processing apparatus of claim 1, wherein a result data element size of each result data element is equal to a source data element size of each source data element, or larger than a source data element size of each source data element.

11. The processing apparatus of claim 10, wherein a number of destination registers of the one or more destination registers is determined based on a ratio of the result data element size and the source data element size.

12. The processing apparatus of claim 11, wherein:
the one or more destination registers are arranged to form a result array comprising a number of rows equal to the number of destination registers, and a number of columns equal to a number of data elements in each destination register; and
result data elements are arranged in the result array in row-major order or column-major order.

13. The processing apparatus of claim 1, wherein a number of second source data elements extracted from the one or more further source vector registers is equal to a number of sources registers in the plurality of source registers.

14. The processing apparatus of claim 1, wherein the one or more destination registers are one or more horizontal or vertical tile slices of one or more tile registers, each of the one or more tile registers comprising a vertically and horizontally addressable two dimensional array of data elements.

15. The processing apparatus of claim 1, wherein:
the one or more further source vector registers comprises a same number of vector registers as the plurality of source vector registers; and
extracting the second source data elements from the one or more further source vector registers comprises extracting the second source data elements from the data element position of each further source vector register.

16. The processing apparatus of claim 1, wherein extracting the second source data elements from the one or more further source vector registers comprises extracting a same set of source data elements for each data element position.

17. The processing apparatus of claim 16, wherein the one or more further source vector registers comprises a single further source vector register.

18. A method for operating a processing apparatus comprising decode circuitry to decode instructions and processing circuitry to selectively apply vector processing operations specified by the instructions to input data vectors comprising a plurality of input data items at respective positions in the input data vectors, the method comprising:
generating, using the decode circuitry, in response to a vector combining instruction specifying a plurality of source vector registers each comprising source data elements in a plurality of data element positions, one or more further source vector registers, and one or more destination registers, control signals to cause the processing circuitry to perform the steps of, for each data element position of the plurality of data element positions:
extracting first source data elements from the data element position of each source vector register;
extracting second source data elements from the one or more further source vector registers;
performing combining operations to generate a result data element, wherein the result data element is calculated by combining each element of the first source data elements and the second source data elements; and
storing the result data element to the data element position of the one or more destination registers, and
wherein the combining operations comprise:
source combining operations to generate intermediate data elements, each intermediate data element generated by combining a corresponding first source data element of the first source data elements with the second source data elements;
intermediate combining operations to combine the intermediate data elements to generate the result data element.

19. A non-transitory computer-readable medium storing computer-readable code for controlling a host processing apparatus to provide an instruction execution environment, comprising:
decode logic to decode instructions; and
processing logic to selectively apply vector processing operations specified by the instructions to input data vectors comprising a plurality of input data items at respective positions in the input data vectors,
wherein the decode logic is configured to, in response to a vector combining instruction specifying a plurality of source vector registers each comprising source data elements in a plurality of data element positions, one or more further source vector registers, and one or destination registers, generate control signals to cause the processing logic to, for each data element position of the plurality of data element positions:

extract first source data elements from the data element position of each source vector register;

extract second source data elements from the one or more further source vector registers;

perform combining operations to generate a result data element, wherein the result data element is calculated by combining each element of the first source data elements and the second source data elements; and store the result data element to the data element position of the one or more destination registers, and wherein the combining operations comprise:

source combining operations to generate intermediate data elements, each intermediate data element generated by combining a corresponding first source data element of the first source data elements with the second source data elements;

intermediate combining operations to combine the intermediate data elements to generate the result data element.

* * * * *